US012770210B2

(12) United States Patent
Baldwin et al.

(10) Patent No.: US 12,770,210 B2
(45) Date of Patent: Oct. 20, 2026

(54) REDUCING AR POWER CONSUMPTION VIA BOUNDING SPARSE CONTENT

(71) Applicant: QUALCOMM Incorporated, San Diego, CA (US)

(72) Inventors: Cullum James Baldwin, San Diego, CA (US); Walker Curtis, San Diego, CA (US); Mahdi Shaghaghi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 18/537,461

(22) Filed: Dec. 12, 2023

(65) Prior Publication Data

US 2025/0191106 A1 Jun. 12, 2025

(51) Int. Cl.
*G06T 1/20* (2006.01)
*G06T 19/00* (2011.01)

(52) U.S. Cl.
CPC .............. *G06T 1/20* (2013.01); *G06T 19/006* (2013.01); *G06T 2200/04* (2013.01); *G06T 2210/12* (2013.01)

(58) Field of Classification Search
CPC ..... G06T 1/20; G06T 19/006; G06T 2200/04; G06T 2210/12; G06T 15/005; G06T 11/00
See application file for complete search history.

(56) References Cited

U.S. PATENT DOCUMENTS 7,343,046 B2 * 3/2008 Curry ....................... H04N 1/56 382/302
12,169,894 B1 * 12/2024 Daly ..................... G06T 15/405
(Continued)

FOREIGN PATENT DOCUMENTS

WO WO-2010070302 A2 * 6/2010 ............. G06T 15/00
WO WO-2021226535 A1 * 11/2021 ........... G06T 19/006

OTHER PUBLICATIONS

3DG: "V-PCC Codec Description", 129. MPEG Meeting, Motion Picture Expert Group or ISO/IEC JTC1/SC29/WG11, No. n19092, Brussels, Jan. 13, 2020-Jan. 17, 2020, 69 Pages, Apr. 3, 2020, XP030287974, sections: 2. Description of coding features and encoding methods, 2.1 Point Cloud Representation in V-PCC, 2.1.1 Patch description, figure 5.

(Continued)

*Primary Examiner* — Devona E Faulk
*Assistant Examiner* — Donna J. Ricks
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for reducing AR power consumption via bounding sparse content. A processor obtains, for a frame of graphics content, a first indication of at least one of: the frame, a graphics processor tracked active pixel region associated with the frame, tile tracking compression metadata of the frame, or render associated tiles of the frame. The processor computes, based on the first indication, a set of bounding areas for a set of active pixels of the frame. The processor configures a workload for at least one of a composition or a reprojection on the computed set of bounding areas. The processor outputs a second indication of the configured workload for at least one of the composition or the reprojection on the computed set of bounding areas for the set of active pixels of the frame.

20 Claims, 18 Drawing Sheets

(56) References Cited

U.S. PATENT DOCUMENTS

| | | | | |
|---|---|---|---|---|
| 2002/0174584 | A1* | 11/2002 | White .................. | A47G 1/0616 40/800 |
| 2005/0174584 | A1* | 8/2005 | Chalmers ........... | G01B 11/0625 356/630 |
| 2013/0182007 | A1* | 7/2013 | Syeda-Mahmood .. | G16H 30/40 345/629 |
| 2018/0081429 | A1 | 3/2018 | Akenine-Moller et al. | |
| 2020/0279433 | A1* | 9/2020 | Matlage ................ | G06T 15/005 |
| 2023/0039100 | A1 | 2/2023 | Melkote Krishnaprasad et al. | |

OTHER PUBLICATIONS

International Search Report and Written Opinion—PCT/US2024/056732—ISA/EPO—Mar. 4, 2025.

* cited by examiner

REDUCING AR POWER CONSUMPTION VIA BOUNDING SPARSE CONTENT

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for pixel processing may be based on information from graphics processor hardware that is not configured to track and report inactive regions of rendered content. There is a need for improved techniques for limiting pixel processing on inactive regions of rendered content.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for graphics processing. The apparatus includes a memory; and a processor coupled to the memory and, based on information stored in the memory, the processor is configured to: obtain, for a frame of graphics content, a first indication of at least one of: the frame, a graphics processor tracked active pixel region associated with the frame, tile tracking compression metadata of the frame, or render associated tiles of the frame; compute, based on the first indication, a set of bounding areas for a set of active pixels of the frame; configure a workload for at least one of a composition or a reprojection on the computed set of bounding areas for the set of active pixels of the frame; and output a second indication of the configured workload for at least one of the composition or the reprojection on the computed set of bounding areas for the set of active pixels of the frame.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
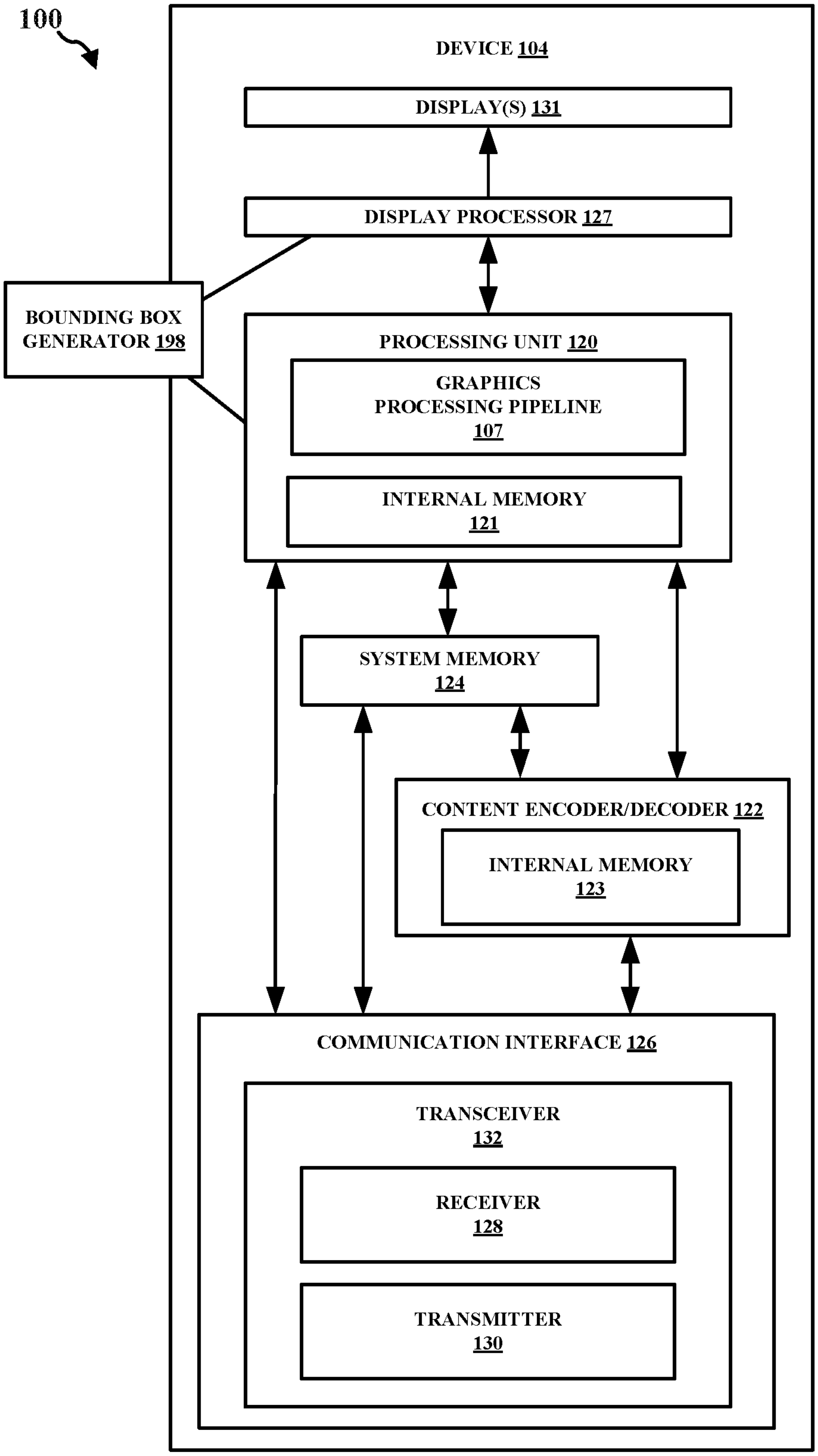
FIG. 1 is a block diagram that illustrates an example content generation system in accordance with one or more techniques of this disclosure.

Various aspects of systems, apparatuses, computer program products, and methods are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A user may wear a display device in order to experienced extended reality (XR) content. XR may refer to a technology that blends aspects of a digital experience and the real world. XR may include augmented reality (AR), mixed reality (MR), and/or virtual reality (VR). In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. In MR, MR objects may be superimposed on a real-world environment as perceived through the display device and the user may interact with the MR objects. In some aspects, MR objects may include "video see through" with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. In VR, a user may experience a fully-immersive digital environment in which the real-world is blocked out. VR content may be experienced through a HMD.

AR devices may be designed to be small and/or lightweight in order for the AR devices to be worn on/over heads of users. For instance, an AR device may be a head mounted device that is mounted on a head of a user. The small and/or lightweight nature of the AR device may cause the AR device to have a relatively low battery life. To help to conserve battery life of the AR device, the AR device (or another device) may render AR content to be "sparse" to limit a total number of processed pixels, that is, the rendered AR content, when displayed on a display panel, may cover a first area and a display panel of the AR device may be a second area that is greater than the first area, and the first area may also be less than a threshold area of the display panel. In an example, the threshold area may be 50% of the display panel, 25% of the display panel, 10% of the display panel, 5% of the display panel, etc. In a more specific example, an AR device may include AR glasses that have a transparent or semi-transparent display surface, and the AR content may be a digital character that takes up 10% of an area of the transparent or semi-transparent display surface. In the example, the 10% of the area of the transparent or semi-transparent display surface may include "active pixels" (i.e., an active region), as the active pixels are displaying AR content. In contrast, the remaining 90% of the area of the transparent or semi-transparent display surface may include "inactive pixels" (i.e., an inactive region) as the inactive pixels are not displaying AR content. When a user of the AR device views the active pixels, the user may perceive the digital character, whereas when the user of the AR device views the inactive pixels, the user may perceive a real world environment of the user. To help to conserve battery life of the AR device, the AR device (or another device) may skip certain processing on inactive pixels, as such pixels are not used to present AR content to a user. For instance, the AR device (or another device) may skip inactive pixels when performing frame composition, color space conversion, reprojection/warping, and/or display output. However, render sources (e.g., graphics processor hardware) may not be configured to track and report inactive pixels to hardware that is configured to perform frame composition, color space conversion, reprojection/warping, and/or display output. Thus, the aforementioned hardware may not be informed as to which pixels are to be skipped while performing frame composition, color space conversion, reprojection/warping, and/or display output.

Various technologies pertaining to reducing augmented reality (AR) power consumption via bounding sparse content are described herein. In an example, an apparatus (e.g., a display processor, a graphics processor, a hardware block between a graphics processor and a display processor, etc.) obtains, for a frame of graphics content, a first indication of at least one of: the frame, a graphics processor tracked active pixel region associated with the frame, tile tracking compression metadata of the frame, or render associated tiles of the frame. The apparatus computes, based on the first indication, a set of bounding areas for a set of active pixels of the frame. The apparatus configures a workload for at least one of a composition or a reprojection on the computed set of bounding areas for the set of active pixels of the frame. The apparatus outputs a second indication of the configured workload for at least one of the composition or the reprojection on the computed set of bounding areas for the set of active pixels of the frame. Vis-à-vis computing the set of bounding areas for the set of active pixels based on the first indication, the apparatus may perform pixel processing on the set of active pixels of the frame and avoid performing pixel processing (e.g., composition, color conversion, reprojection/warp, display-output, etc.) on inactive pixels of the frame. Thus, the above-described technologies may reduce power consumption of the apparatus and/or may reduce usage of computational resources of the apparatus.

AR devices may be power constrained and as such, rendered content may be sparse. Thus, power may be saved by skipping rendering (i.e., refraining from rendering) inactive pixels/regions. Strategies are provided herein for identifying bounding regions for active pixels in sparse AR content. The strategies may include tracking pixel output locations (e.g., graphics processing unit (GPU) pixel output locations), calculating row sums and column sums, using header/metadata of compressed regions/tiles, using a GPU tile output for multi-bounding-box calculations via numbered blob detection, using header/metadata of compressed regions/tiles to identify multiple regions/tiles, and/or using a GPU tile output to identify multiple tiles.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 and/or the display processor 127 may include a bounding box generator 198 configured to obtain, for a frame of graphics content, a first indication of at least one of: the frame, a graphics processor tracked active pixel region associated with the frame, tile tracking compression metadata of the frame, or render associated tiles of the frame; compute, based on the first indication, a set of bounding areas for a set of active pixels of the frame; configure a workload for at least one of a composition or a reprojection on the computed set of bounding areas for the set of active pixels of the frame; and output a second indication of the configured workload for at least one of the composition or the reprojection on the computed set of bounding areas for the set of active pixels of the frame. Although the following description may be focused on graphics processing, the concepts described herein may be applicable to other similar processing techniques. Furthermore, although the following description may be focused on AR content and AR devices, the concepts presented herein may also be applicable to other types of content, such as XR content, MR content, and/or VR content and other types of devices, such as XR devices, MR devices, and/or VR devices. Additionally, although the following description may be focused on wearable display devices (e.g., wearable AR devices), the concepts presented herein may also be applicable to non-wearable display devices (e.g., non-wearable AR devices).

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU. Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
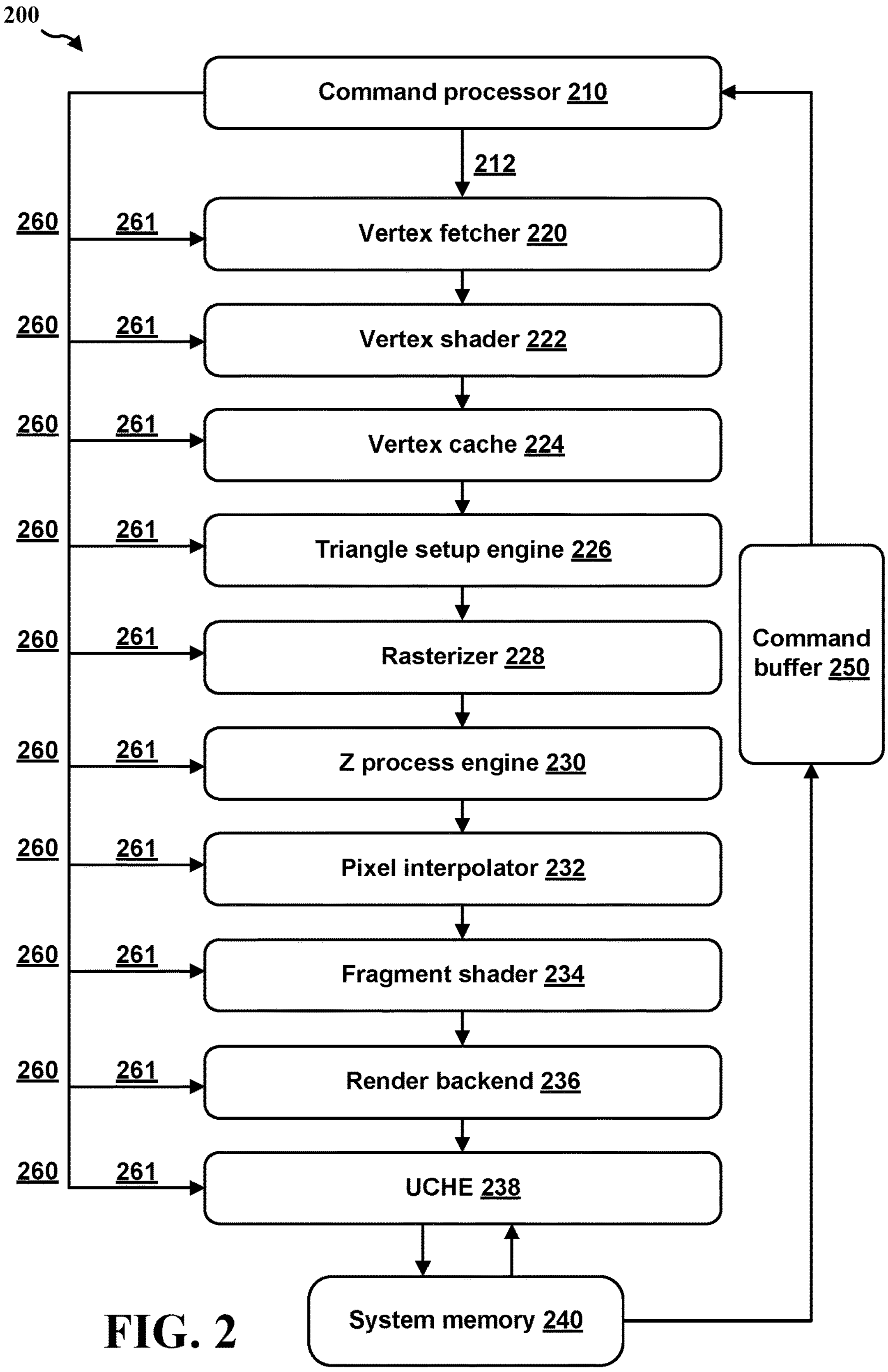
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
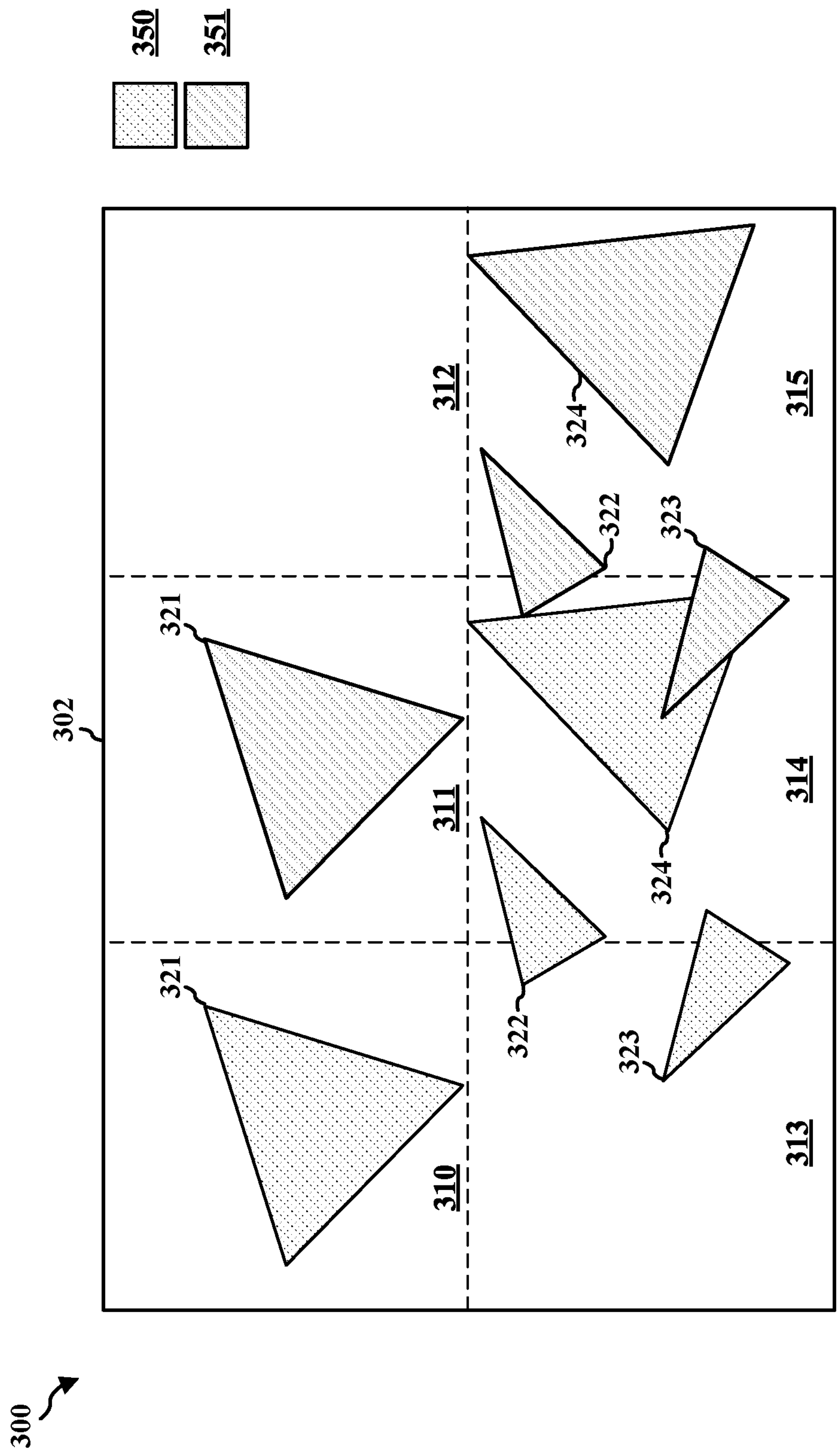
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
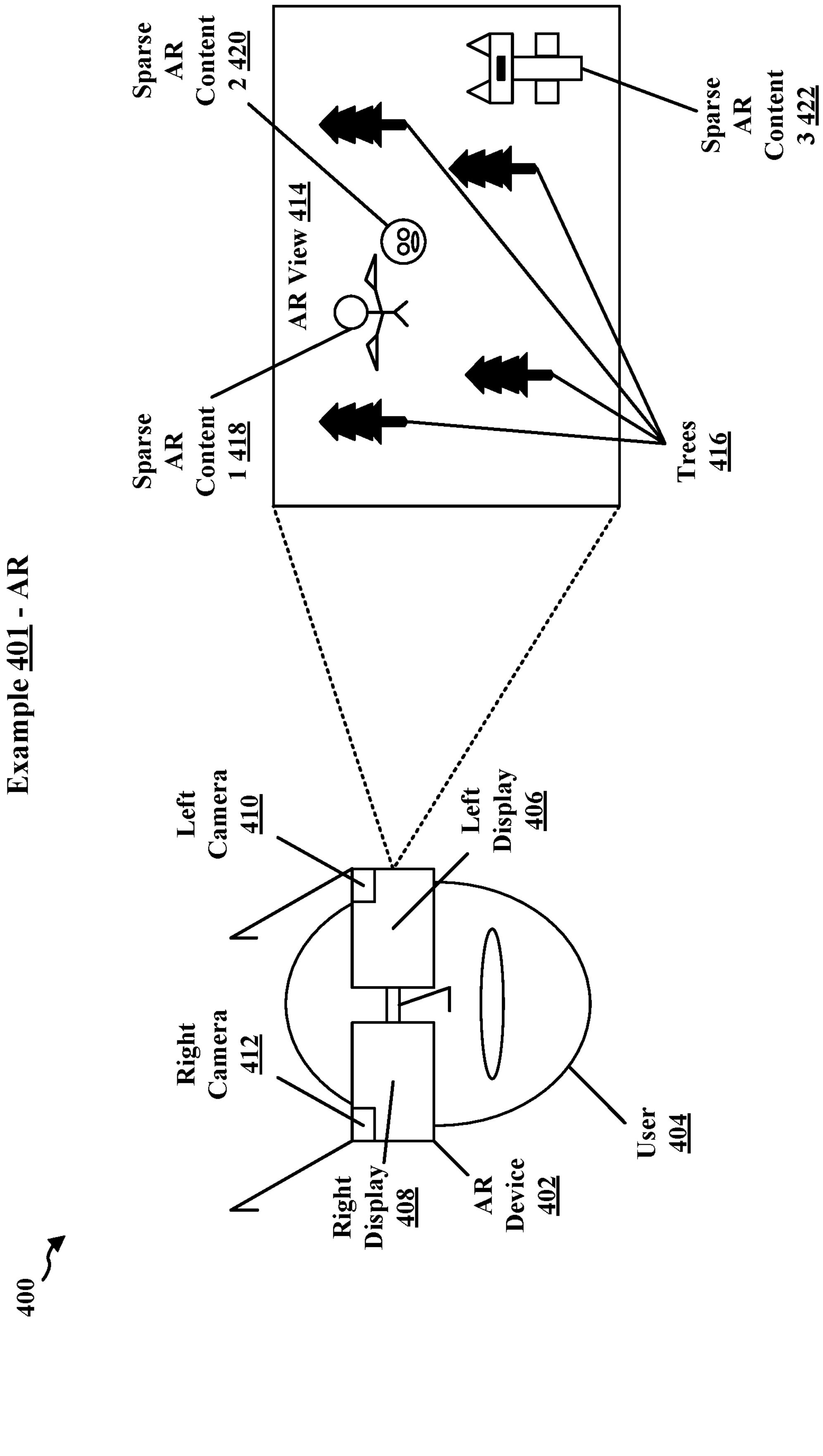
FIG. 4 is a diagram illustrating an example of aspects of augmented reality (AR) in accordance with one or more techniques of this disclosure.

FIG. 4 is a diagram 400 illustrating an example 401 of aspects of augmented reality (AR) in accordance with one or more techniques of this disclosure. An AR device 402 may be worn on/over/near a head of a user 404. In an example, the AR device 402 may be or include the device 104. In an example, the AR device 402 may be lightweight and/or may have a small form factor to make the AR device 402 comfortable to wear for the user 404; however, the lightweight and/or small form factor of the AR device 402 may cause the AR device 402 to be power constrained (i.e., have a limited battery life).

The AR device 402 may include a left display 406 and a right display 408. When the AR device 402 is worn on/over/near the head of the user, the left display 406 may be positioned within several centimeters from a left eye of the user 404 and the right display 408 may be positioned within several centimeters from a right eye of the user 404. As such, a left gaze of the left eye of the user may be directed towards the left display 406 and a right gaze of the right eye of the user may be directed towards the right display 408. In an example, the left display 406 and the right display 408 may be made of a transparent display surface or a semi-transparent display surface, such as glass. In an example, the left display 406 and the right display 408 may be included in the display(s) 131. In one aspect (not illustrated in FIG. 4), the AR device 402 may include a single display with a left region corresponding to the left display 406 and a right region corresponding to the right display 408.

The AR device 402 may include a left camera 410 corresponding to the left eye of the user 404 and a right camera 412 corresponding to the right eye of the user 404, that is, a lens of the left camera 410 may be directed towards a direction similar to a direction of a gaze of the left eye of the user 404 and a lens of the right camera 412 may be directed towards a direction similar to a direction of a gaze of the right eye of the user 404. In an example, the left camera 410 and the right camera 412 may be video cameras. The left camera 410 and the right camera 412 may enable the AR device 402 to perceive an environment of the user 404. In one aspect, the left display 406 and the right display 408 may include opaque display surfaces, and as such, the left camera 410 and the right camera 412 may capture images of a real world environment of the user 404, whereupon the images may be presented on the left display 406 and the right display 408, respectively.

In an example, when the user 404 wears the AR device 402 in an environment and when an AR application is executing on the AR device 402, the AR device 402 may present the user 404 with an AR view 414 via the left display 406 and the right display 408. In the example, the AR view 414 may include trees 416, where the trees 416 may be real world objects in the environment of the user 404 that eyes of the user 404 are directed towards. The AR view 414 may also include first sparse AR content 418, second sparse AR content 420, and third sparse AR content 422, where the first sparse AR content 418, the second sparse AR content 420, and the third sparse AR content 422 may be non-real world content generated by the AR application executing on the AR device 402. Stated differently, the trees 416 may correspond to a real world view of the environment of the user, whereas the first sparse AR content 418, the second sparse AR content 420, and the third sparse AR content 422 may be AR content that is superimposed on the real-world view.

As used herein, the term "sparse AR content" may refer to AR content that, when displayed on display panel(s) of an AR device, occupies less than a threshold area (i.e., a threshold area percentage) of the display panel(s) of the AR device. Sparse XR content may include sparse AR content. In an example, AR content may be sparse AR content when the AR content occupies less than 50% of the display panel(s), less than 25% of the display panel(s), less than 10% of the display panel(s), less than 5% of the display panel(s), etc. In one aspect, AR content may be considered to be sparse AR content when a sum of areas of each instance of AR content is less than the threshold area. In another aspect, an instance of AR content may be considered to be sparse AR content when an area of the instance of the AR content is less than the threshold area, even if an area comprised by all instances of AR content is greater than the threshold area. Sparse AR content may limit a total number of pixels processed by the AR device 402.

Figure 5:
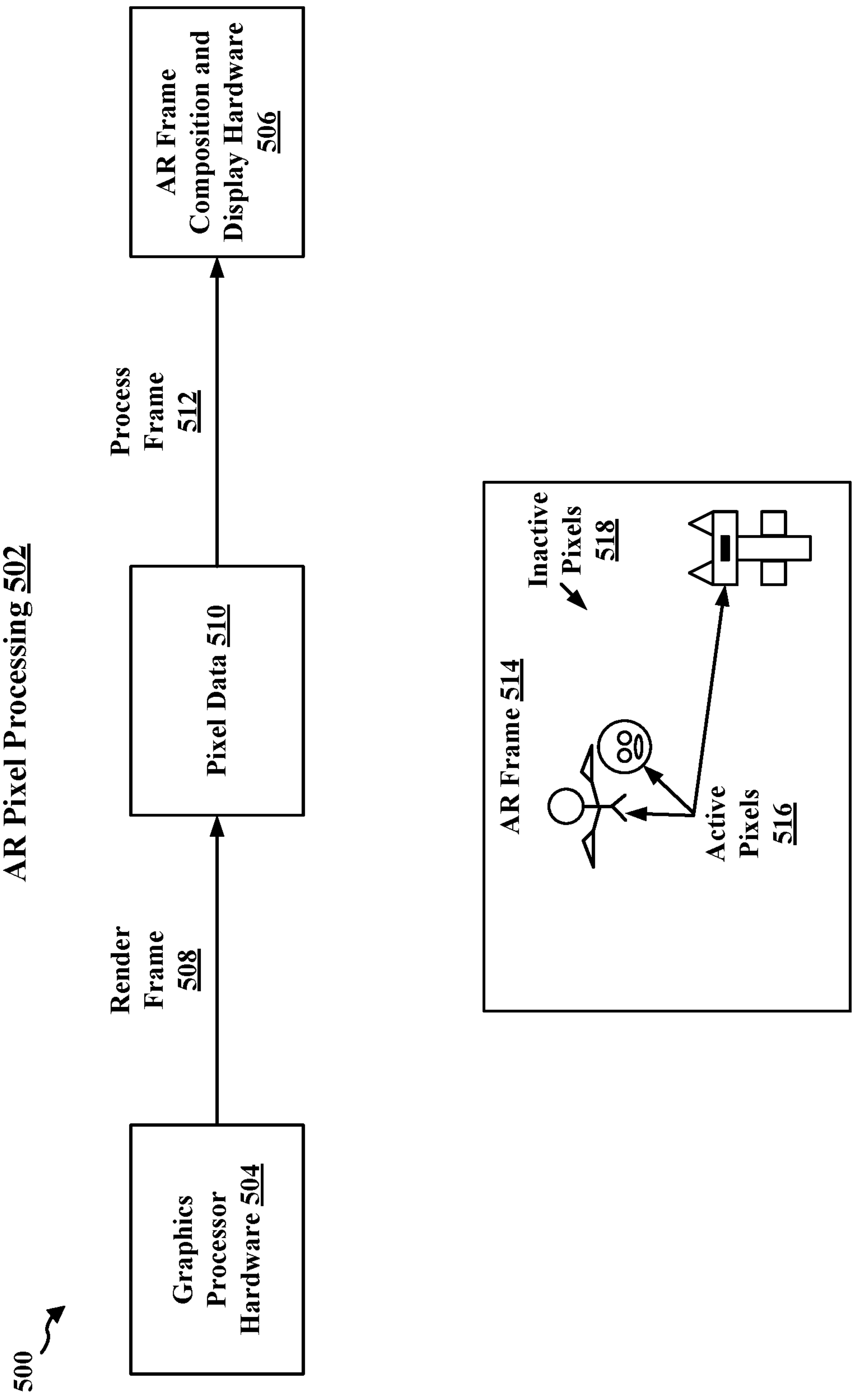
FIG. 5 is a diagram illustrating example aspects pertaining to AR pixel processing in accordance with one or more techniques of this disclosure.

FIG. 5 is a diagram 500 illustrating example aspects pertaining to AR pixel processing 502 in accordance with one or more techniques of this disclosure. An AR device (e.g., the AR device 402) may include graphics processor hardware 504 (e.g., GPU hardware) and AR frame composition and display hardware 506. At 508, the graphics processor hardware 504 may be configured to render a frame. A frame may refer to an image that is part of a series of images that are displayed sequentially. Rendering the frame at 508 may generate pixel data 510 associated with the frame. At 512, the AR frame composition and display hardware 506 may be configured to process the frame (i.e., process the pixel data 510). For instance, the AR frame composition and display hardware 506 may perform a frame composition, a color space conversion, a reprojection/warp, a segmentation, and a display-output on the pixel data 510. A frame composition (which may also be referred to as a "composition") may refer to arranging different layers to generate a frame that can be displayed. A reprojection (which may also be referred to as a warp) may refer to adjusting a frame (or portion(s) thereof) to account for a change in a head pose of a user between a render time and a display time. A color space conversion may refer to converting an image from a first color space to a second color space. A segmentation may refer to a process of partitioning a frame into multiple image segments. A workload for a composition, a reprojection, a color space conversion, a segmentation, etc. may refer to a series of instructions for performing the composition, the reprojection, the color space conversion, the segmentation, etc.

Subsequently, the AR device may present an AR frame 514 on a display panel, where the AR frame 514 is based on the (processed) pixel data 510. The AR frame 514, may include active pixels 516 corresponding to AR content (e.g., the first sparse AR content 418, the second sparse AR content 420, the third sparse AR content 422) and inactive pixels 518 corresponding to non-AR content (e.g., the real world). As used herein, the term "active pixel" may refer to a pixel on a display panel (or a region of a frame corresponding to the pixel) that outputs light corresponding to XR content (e.g., AR content, MR content). The term "active region" may refer to a region on a display panel with active pixels. As used herein, the term "inactive pixel" may refer to a pixel on a display panel (or a region of a frame corresponding to the pixel) that does not output light corresponding to XR content (e.g., AR content, MR content). The term "inactive region" may refer to a region on a display panel with inactive pixels. Stated differently, inactive pixels may correspond to regions of a display panel that are not displaying AR content. As such, a user of an AR device may be able to perceive the real world in a region of a display panel that includes inactive pixels.

In one example, the concepts presented herein may be applicable to MR content. For instance, in MR content, a “background” may be a full screen camera look-through layer and content overlaid upon the background may be sparse. A device (e.g., the device 104) may save power by finding pixel bounding boxes on sparse overlay layers, which may reduce a total number of pixels processed in a final composition.

As indicated above, an AR device may have a limited battery life. The AR device may conserve battery power using different strategies. In a first strategy, the AR device may render fewer pixels (i.e., generate sparse AR content), which may reduce power consumption of the AR device. For instance, the graphics processor hardware 504 may render sparse AR content. In a second strategy, the AR device may skip performing pixel processing on inactive pixels (i.e., inactive regions) during frame composition, color space conversion, reprojection/warp, and/or display-output. For instance, the AR frame composition and display hardware 506 may skip performing frame composition, color space conversion, reprojection/warp, and/or display-output on the inactive pixels. However, the graphics processor hardware 504 may not be configured to track and report active/inactive regions (i.e., active/inactive pixels) of rendered content to the AR frame composition and display hardware 506. Thus, the AR frame composition and display hardware 506 may not have information as to which pixels are to be skipped for pixel processing.

Figure 6:
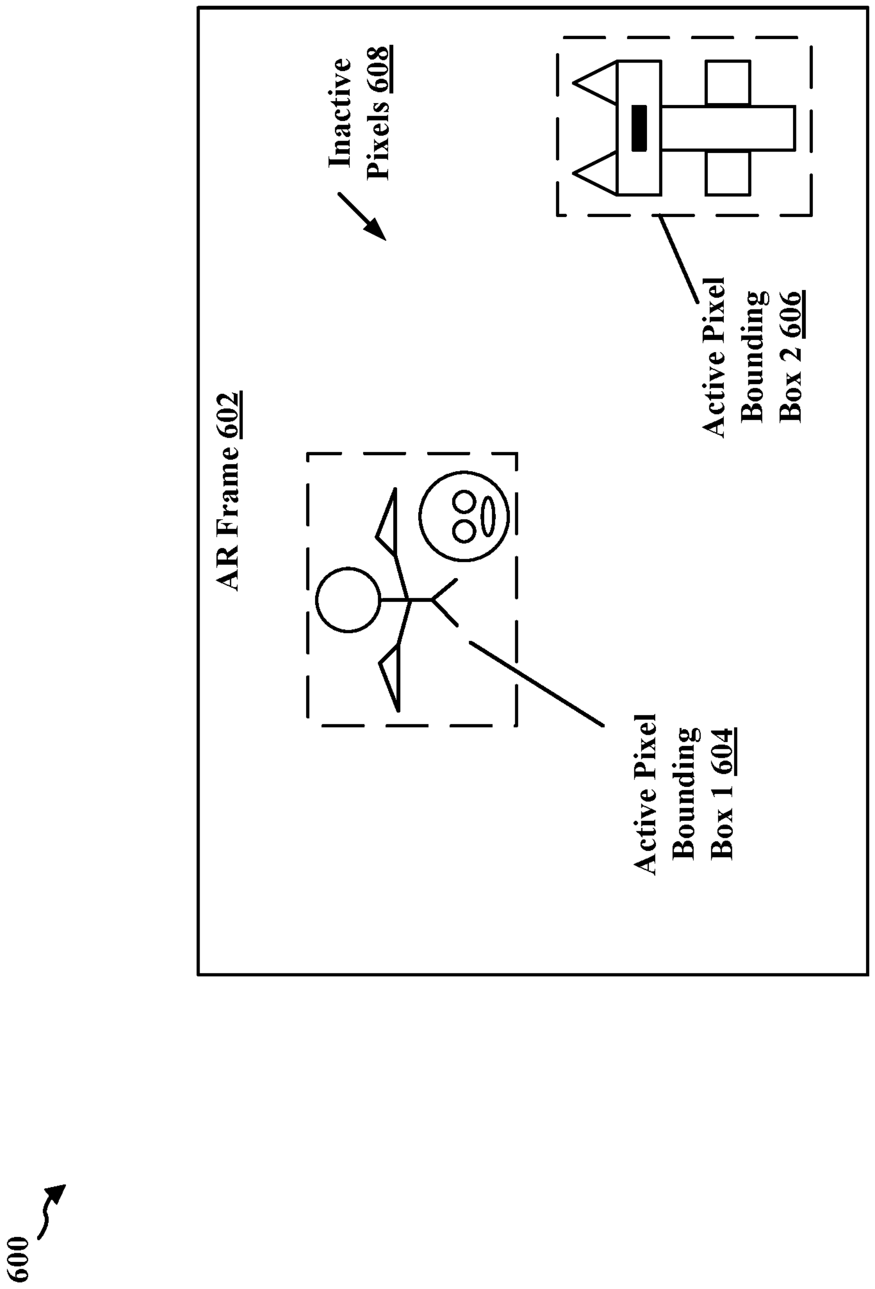
FIG. 6 is a diagram illustrating an example of an AR frame in accordance with one or more techniques of this disclosure.

FIG. 6 is a diagram 600 illustrating an example of an AR frame 602 in accordance with one or more techniques of this disclosure. Various strategies for efficiently finding/determining/calculating bounding area(s) for active pixels in sparse AR content are described herein. A bounding area may encompass (i.e., enclose) AR content (i.e., active pixels). As used herein, a bounding area may include a bounding box or a bounding region. A bounding box may refer to a rectangular box that encompasses AR content (e.g., an AR object). A bounding region may refer to a non-rectangular box that encompasses AR content (e.g., an AR object). In an example, a bounding region may include three sides or more than four sides. An AR device may perform pixel processing (e.g., frame composition, color space conversion, reprojection/warp, and/or display-output) on pixels encompassed by the bounding areas, whereas the AR device may skip performing the pixel processing on pixels that are not encompassed by the bounding areas. Thus, the technologies described herein may reduce computational burdens and/or power burdens on the AR device.

In an example, using the technologies described herein, an AR device (e.g., the AR device 402) may generate an AR frame 602 and active pixel bounding boxes, where each active pixel bounding box may include an instance of AR content (or more than one instance of AR content). In an example, the AR device may generate a first active pixel bounding box 604 that encompasses the first sparse AR content 418 and the second sparse AR content 420. In an example, the AR device may generate the first active pixel bounding box 604 based on the first sparse AR content 418 and the second sparse AR content 420 being located within a threshold distance of one another. The AR device may also generate a second active pixel bounding box 606 that encompasses the third sparse AR content 422. The AR device may perform pixel processing (e.g., frame composition, color space conversion, reprojection/warp, and/or display-output) on pixels encompassed by the first active pixel bounding box 604 and the second active pixel bounding box 606. The AR device may skip performing pixel processing (e.g., frame composition, color space conversion, reprojection/warp, and/or display-output) on inactive pixels 608 associated with the AR frame 602, that is, the AR device may skip performing pixel processing on pixels that are not encompassed by the first active pixel bounding box 604 or the second active pixel bounding box 606.

Figure 7:
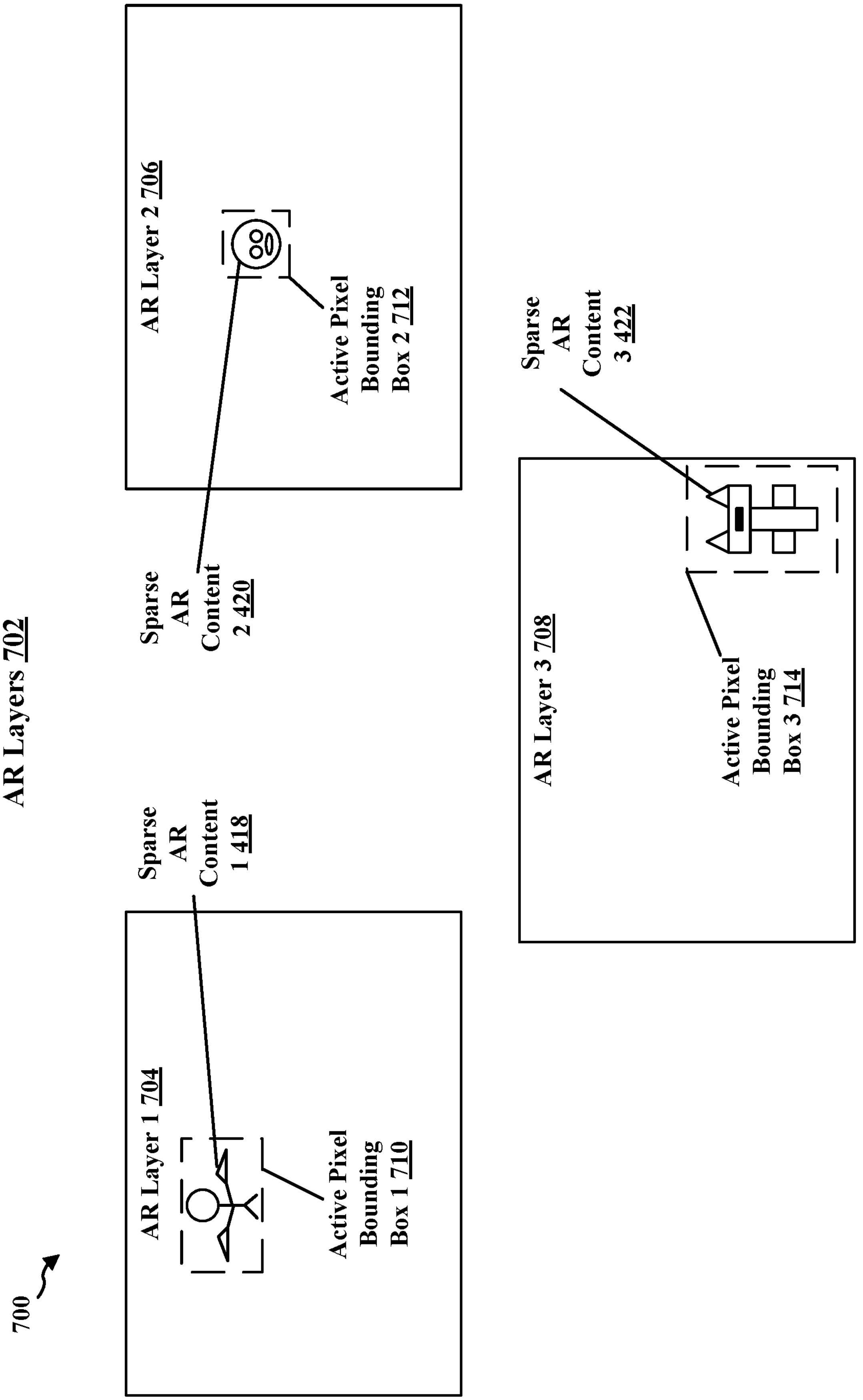
FIG. 7 is a diagram illustrating an example of AR layers in accordance with one or more techniques of this disclosure.

FIG. 7 is a diagram 700 illustrating an example of AR layers 702 in accordance with one or more techniques of this disclosure. A device (e.g., the AR device 402) may render AR in several separate sparse layers. A layer may refer to an element of an image, that, when composed with other layers, forms a complete image. After rendering, the AR device may compose each layer into a final display image that is presented on a display panel. In an example, using the technologies described herein, the AR device may determine/find/calculate a single bounding area (e.g., a bounding box, a bounding region) for each layer. In another example, using the technologies described herein, the AR device may determine/find/calculate more than one bounding area (e.g., a bounding box, a bounding region) for each layer. Some aspects presented herein pertain to a set of strategies for finding a single bounding area (e.g., a bounding box, a bounding region) for an AR layer. Finding a single bounding area may be more computationally efficient than a general multiple bounding area calculation.

In an example, a device (e.g., the AR device 402) may generate a first AR layer 704, a second AR layer 706, and a third AR layer 708, where the first AR layer 704 includes the first sparse AR content 418, where the second AR layer 706 includes the second sparse AR content 420, and where the third AR layer 708 includes the third sparse AR content 422. Using the technologies described herein, a device (e.g., the AR device 402) may find/determine/compute a first active pixel bounding box 710 that encompasses the first sparse AR content 418, a second active pixel bounding box 712 that encompasses the second sparse AR content 420, and a third active pixel bounding box 714 that encompasses the third sparse AR content 422.

Figure 8:
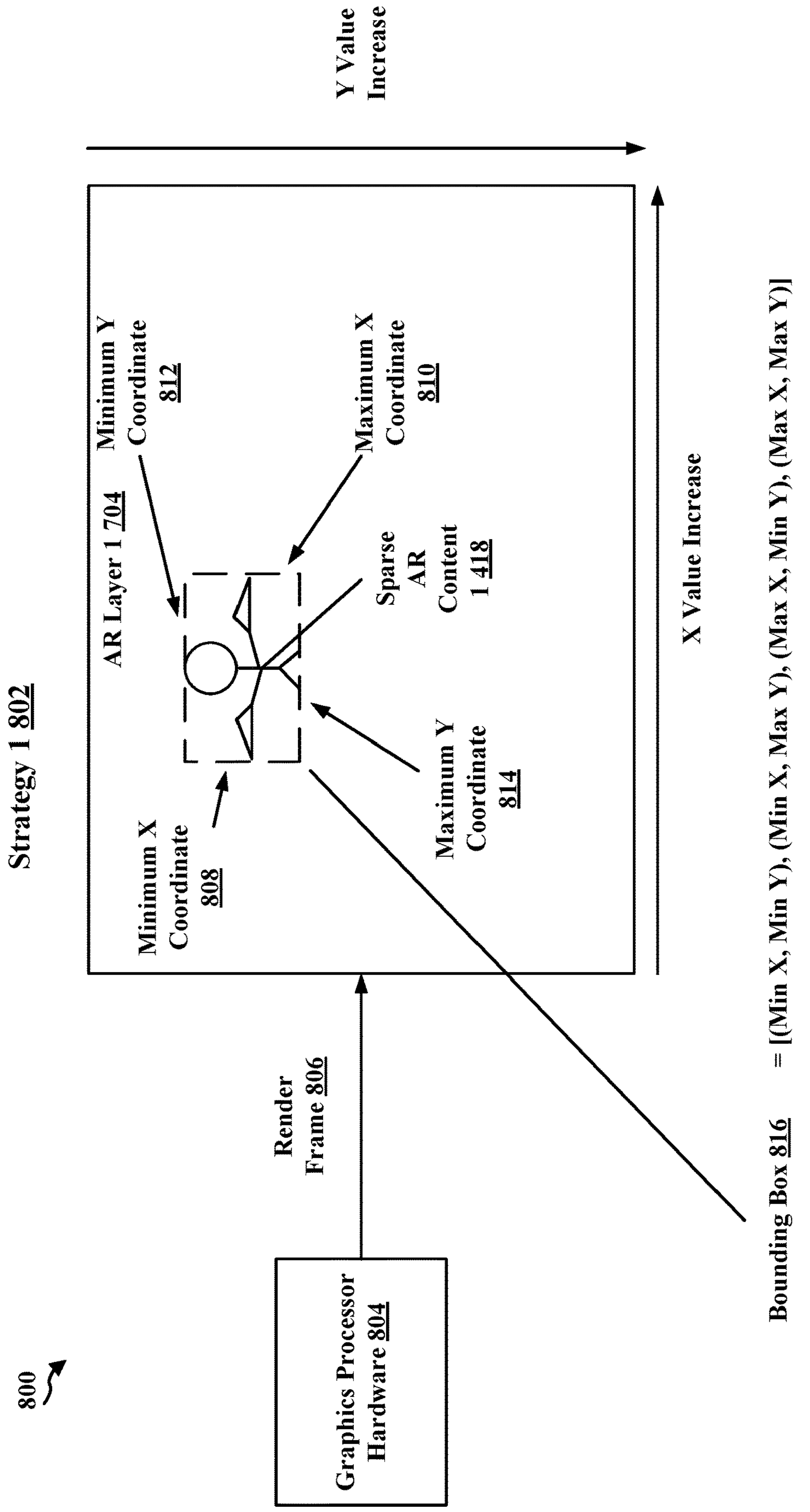
FIG. 8 is a diagram illustrating a first strategy for finding a single bounding box for an AR layer in accordance with one or more techniques of this disclosure.

FIG. 8 is a diagram 800 illustrating a first strategy 802 for finding a single bounding box for an AR layer in accordance with one or more techniques of this disclosure. The first strategy 802 may be associated with tracking GPU pixel output locations to find a bounding region. In the first strategy 802, graphics processor hardware 804 of a device (e.g., the AR device 402) may track pixel output locations written for an output frame or an AR layer (e.g., for the first AR layer 704) as the frame or the AR layer is rendered at 806. The pixel output locations may include a minimum X coordinate 808 (which may also be referred to as “Min X”), a maximum X coordinate 810 (which may also be referred to as “Max X”), a minimum Y coordinate 812 (which may also be referred to as “Min Y”), and a maximum Y coordinate 814 (which may also be referred to as “Max Y”). The minimum X coordinate 808 (i.e., a minimum horizontal coordinate) may refer to a lowest horizontal pixel coordinate at which an active pixel may be found in the first AR layer 704. The maximum X coordinate 810 (i.e., a maximum horizontal coordinate) may refer to a highest horizontal pixel coordinate at which an active pixel may be found in the first AR layer 704. The minimum Y coordinate 812 (i.e., a minimum vertical coordinate) may refer to a lowest vertical pixel coordinate at which an active pixel may be found in the first AR layer 704. The maximum Y coordinate 814 (i.e., a maximum vertical coordinate) may refer to a highest vertical pixel coordinate at which an active pixel may be found in the first AR layer 704. A bounding box 816 may be defined with four corners according to equation (I) below.

$$\text{Bounding Box} = [(\text{Min}X, \text{Min}Y), (\text{Min}X, \text{Max}Y), (\text{Max}X, \text{Min}Y), (\text{Max}X, \text{Max}Y)] \quad \text{(I)}$$

In one aspect, the graphics processor hardware 804 may generate the bounding box 816 according to equation (I). In another aspect, graphics processor software and/or graphics processor firmware may generate the bounding box 816 according to equation (I). In a further aspect, display processor hardware, display processor software, and/or display processor firmware may generate the bounding box 816 according to equation (I). In yet another aspect, a hardware block between graphics processor hardware and display processor hardware may generate the bounding box 816 according to equation (I).

Figure 9:
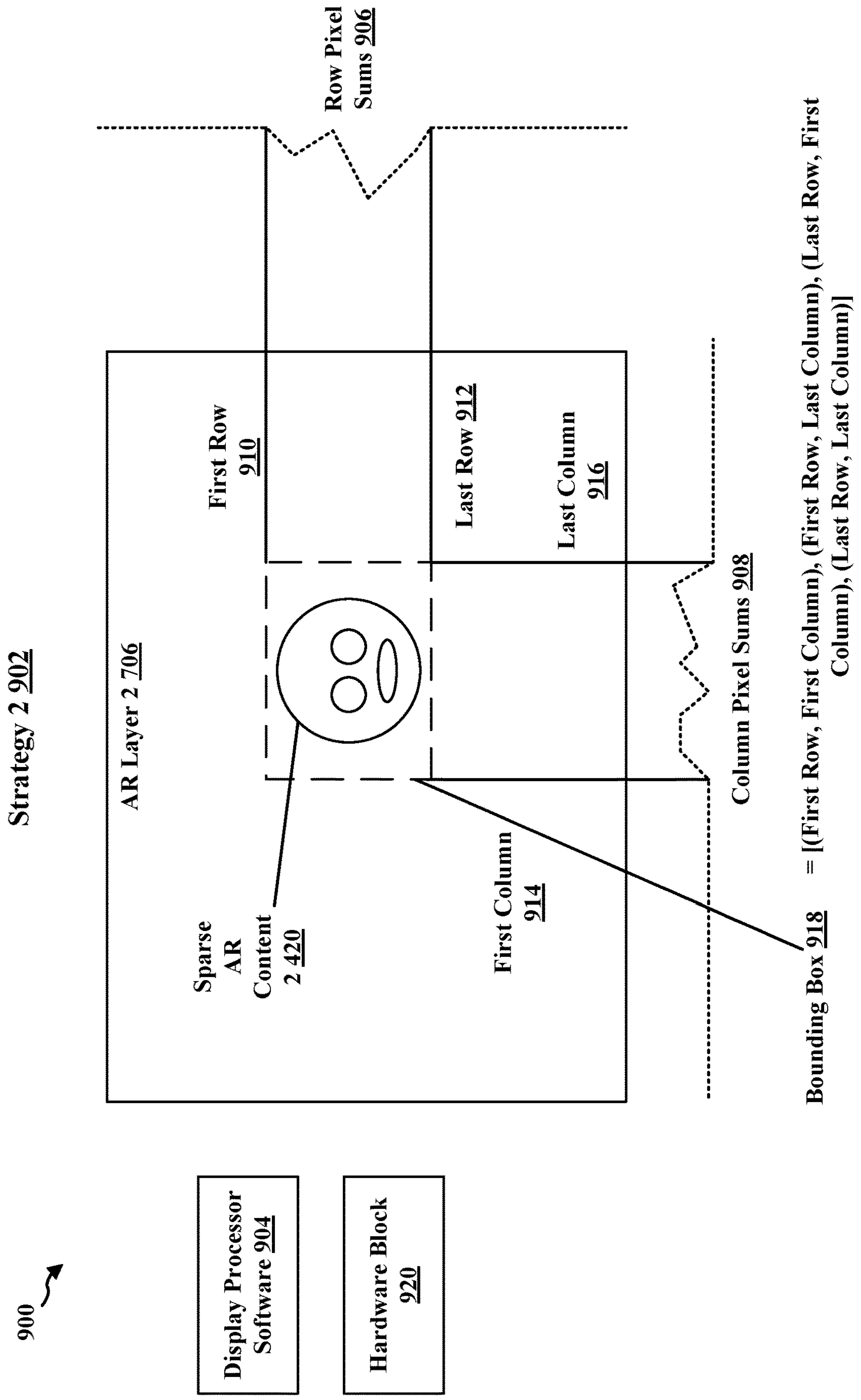
FIG. 9 is a diagram illustrating a second strategy for finding a single bounding box for an AR layer in accordance with one or more techniques of this disclosure.

FIG. 9 is a diagram 900 illustrating a second strategy 902 for finding a single bounding box for an AR layer in accordance with one or more techniques of this disclosure. The second strategy 902 may be associated with calculating row-sums and column-sums to find a bounding region. In the second strategy 902, prior to hardware composition, display processor software 904 executed by a display processor (e.g., the display processor 127 of the device 104) may calculate a pixel sum for each row and for each column in an image (e.g., the second AR layer 706). In an example, for each row in the image, the display processor software 904 may compute a sum of values of each pixel in a row (i.e., compute the row pixel sums 906). A pixel may refer to a smallest addressable element in an image. In the example, for each column in the image, the display processor software 904 may compute a sum of values of each pixel in a column (i.e., compute the column pixel sums 908). In one aspect, the display processor software 904 may compute the row pixel sums 906 and the column pixel sums 908 based on histogram(s) for the image.

In an example, inactive pixels in the image may have a value of zero. As such, a sum of zero for a row or a column may be indicative of a row or a column of inactive pixels, and a non-zero sum for a row or a column may be indicative of (i.e., implies) the presence of active pixels in the row or the column. Thus, the display processor software 904 may read the row pixel sums 906 (e.g., from top to bottom of the image) to determine a first row 910 in the rows of the image that has a non-zero sum and a last row 912 in the rows of the image that has a non-zero sum. Similarly, the display processor software may read the column pixel sums 908 (e.g., from left to right of the image) to determine a first column 914 in the columns of the image that has a non-zero sum and a last column 916 in the columns of the image that has a non-zero sum. The display processor software 904 may compute a bounding box 918 with corners based on the first row 910, the last row 912, the first column 914, and the last column 916. In an example, the bounding box 918 may encompass the second sparse AR content 420. With more particularity, the display processor software 904 may compute the bounding box 918 according to equation (II) below.

$$\text{Bounding Box} = [(\text{First Row, First Column}), (\text{First Row, Last Column}), (\text{Last Row, First Column}), (\text{Last Row, Last Column})] \quad \text{(II)}$$

Although the second strategy 902 is described above as being performed/implemented by display processor software 904, other possibilities are contemplated. For example, a hardware block 920 may perform/implement the second strategy 902 as described above. In an example, the hardware block 920 may be a color space conversion (CSC) hardware block.

Figure 10:
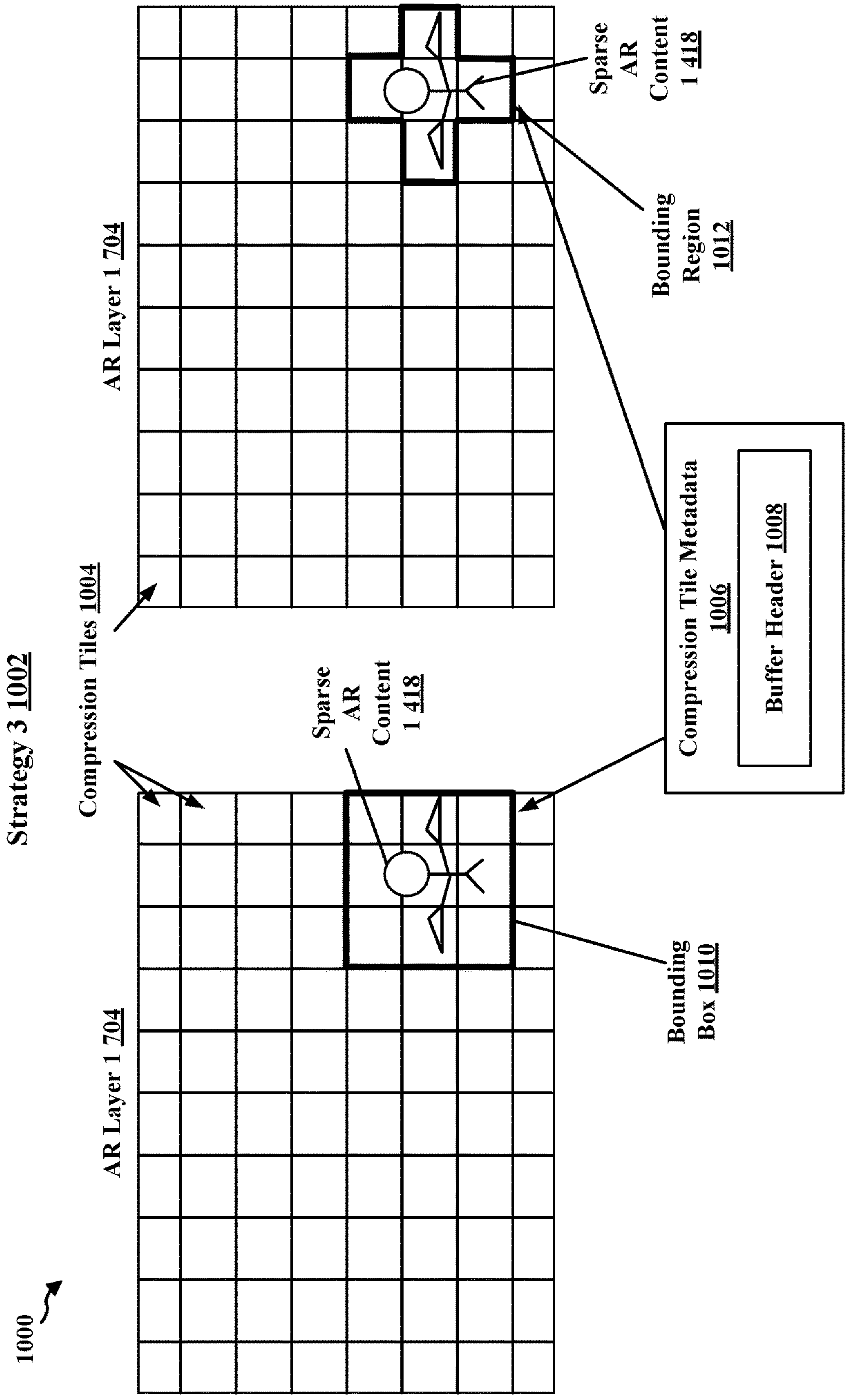
FIG. 10 is a diagram illustrating a third strategy for finding a single bounding box for an AR layer in accordance with one or more techniques of this disclosure.

FIG. 10 is a diagram 1000 illustrating a third strategy 1002 for finding a single bounding box for an AR layer in accordance with one or more techniques of this disclosure. The third strategy 1002 may be associated with using compression header data to imply a bounding region. Graphics associated data (e.g., the first AR layer 704) may be compressed as the graphics associated data is transmitted between different hardware elements of a device (e.g., the device 104) in order to reduce bandwidth demands on the device. For example, a graphics processor may render the first AR layer 704, compress the first AR layer 704, and transmit the (compressed) first AR layer 704 to a display processor. The display processor may receive the (compressed) first AR layer 704, decompress the (compressed) first AR layer 704, and perform further processing on the (decompressed) first AR layer 704.

In an example, a device (e.g., a graphics processor) that compresses/decompresses data according to some compression/decompression formats may subdivide a frame (e.g., the first AR layer 704) into compression tiles 1004 of a fixed size. A compression tile may be a rectangular subdivision of a frame or layer. In the example, the device may maintain compression tile metadata 1006 that includes a buffer header 1008, where the buffer header 1008 indicates which tiles in the compression tiles 1004 include data (i.e., which tiles are "non-empty"). Compression tile metadata (which may also be referred to as tile tracking compression metadata) may refer to data about tiles used for compression purposes. A buffer header may refer to a portion of the compression tile metadata that includes the data about the tiles used for compression purposes.

In the third strategy 1002, a display processor (e.g., the display processor 127) may receive the compression tile metadata 1006 from a graphics processor (e.g., the GPU 200). The display processor may search the compression tile metadata 1006 (e.g., the buffer header 1008 of the compression tile metadata 1006) to determine tiles in the compression tiles 1004 that include data, that is, the display processor may search compression tile metadata 1006 to determine active pixels (i.e., active tiles) in the first AR layer 704. In one example, the display processor may compute (e.g., derive) a bounding box 1010 based on search results for the search, where the bounding box 1010 encompasses the first sparse AR content 418. In another example, the display processor may compute (e.g., derive) a bounding region 1012 based on the search results for the search, where the bounding region 1012 encompasses the first sparse AR content 418.

Although the third strategy 1002 is described above as being performed/implemented by a display processor, other possibilities are contemplated. For example, a hardware block between a graphics processor and a display processor may perform/implement the third strategy 1002 as described above.

Figure 11:
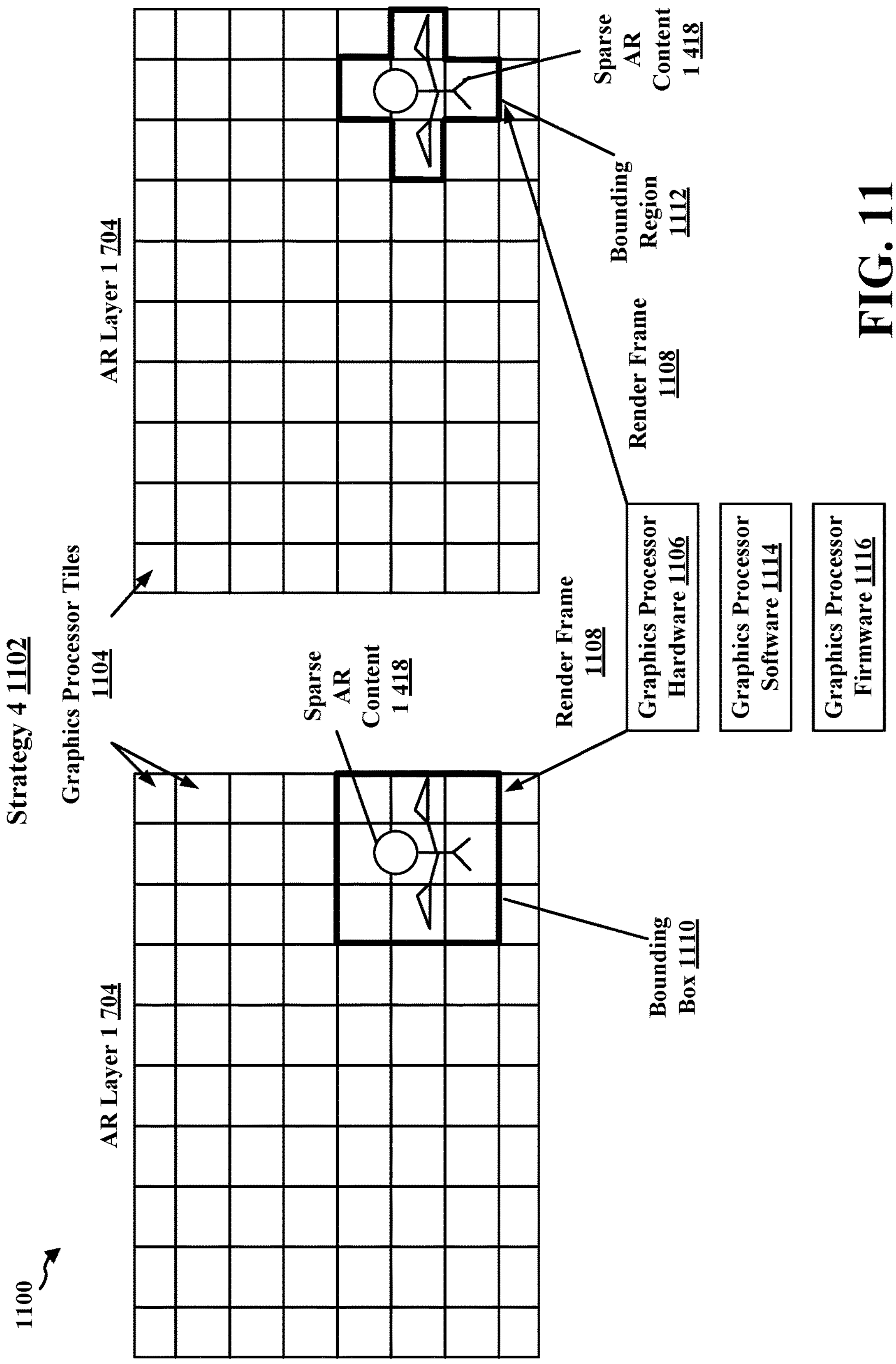
FIG. 11 is a diagram illustrating a fourth strategy for finding a single bounding box for an AR layer in accordance with one or more techniques of this disclosure.

FIG. 11 is a diagram 1100 illustrating a fourth strategy 1102 for finding a single bounding box for an AR layer in accordance with one or more techniques of this disclosure. The fourth strategy 1102 may be associated with using a GPU tile output to imply a bounding region. A graphics processor (e.g., the GPU 200) may subdivide a frame (e.g., the first AR layer 704) into graphics processor tiles 1104 of a fixed size during a render process. The graphics processor tiles 1104 may be referred to as "render associated tiles." A render associated tile may be a rectangular subdivision of a frame or a layer.

In the fourth strategy 1102, graphics processor hardware 1106, during a frame render at 1108, may track tiles (i.e., active tiles) in the graphics processor tiles 1104 that have active pixels. In one example, the graphics processor hardware 1106 may compute (e.g., derive) a bounding box 1110 based on the active tiles, where the bounding box 1110 encompasses the first sparse AR content 418. In another example, the graphics processor hardware 1106 may compute (e.g., derive) a bounding region 1112 based on the active tiles, where the bounding region 1112 encompasses the first sparse AR content 418.

Although the fourth strategy 1102 is described above being performed/implemented by the graphics processor hardware 1106, other possibilities are contemplated. For example, graphics processor software 1114 or graphics processor firmware 1116 may perform/implement the fourth strategy 1102 as described above. Graphics processor hardware may refer to physical elements of a device used for graphics processing. Graphics processor software may refer to computer-readable instructions used for graphics processing. Graphics processor firmware may refer to permanent software used for graphics processing that is programmed into read-only memory.

Figure 12:
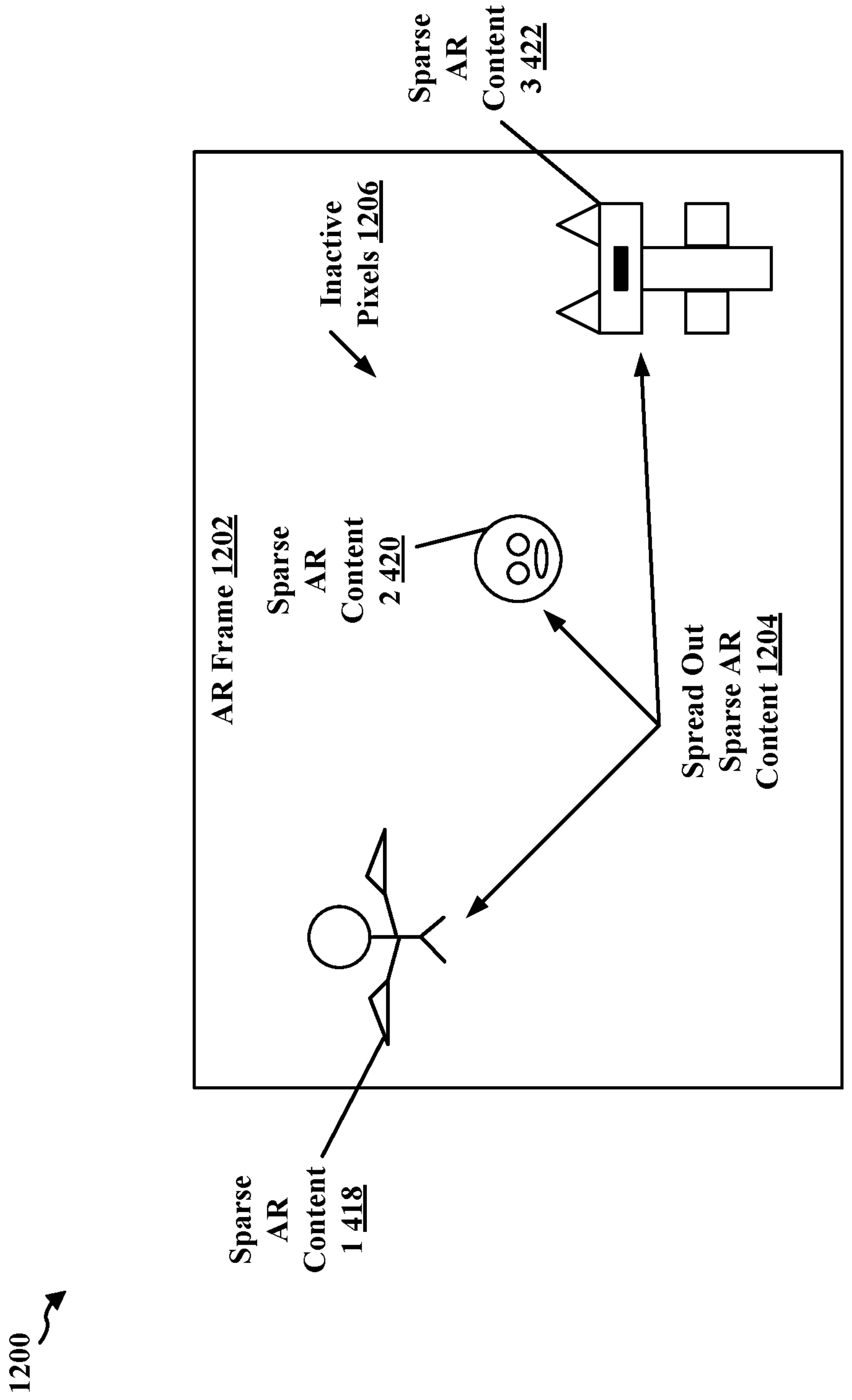
FIG. 12 is a diagram illustrating an example of an AR frame in accordance with one or more techniques of this disclosure.

FIG. 12 is a diagram 1200 illustrating an example of an AR frame 1202 in accordance with one or more techniques of this disclosure. In some examples, AR content may be sparse, but relatively "spread out" among a frame, that is, a distance between different instances of AR content in the frame may exceed a threshold distance. For example, the AR frame 1202 may include spread out sparse AR content 1204. The spread out sparse AR content 1204 may include the first sparse AR content 418, the second sparse AR content 420, and the third sparse AR content 422, where a distance between each of the first sparse AR content 418, the second sparse AR content 420, and the third sparse AR content 422 may exceed a threshold distance. Stated differently, a relatively large amount of inactive pixels 1206 may exist between each of the first sparse AR content 418, the second sparse AR content 420, and the third sparse AR content 422. In the case of the spread out sparse AR content 1204, computing (i.e., calculating) multiple bounding areas (e.g., multiple bounding boxes and/or multiple bounding regions) may be more computationally complex compared to computing a single bounding area; however, multiple bounding areas may provide power savings to a device (e.g., the device 104). Various strategies for computing multiple bounding areas are described below.

Figure 13:
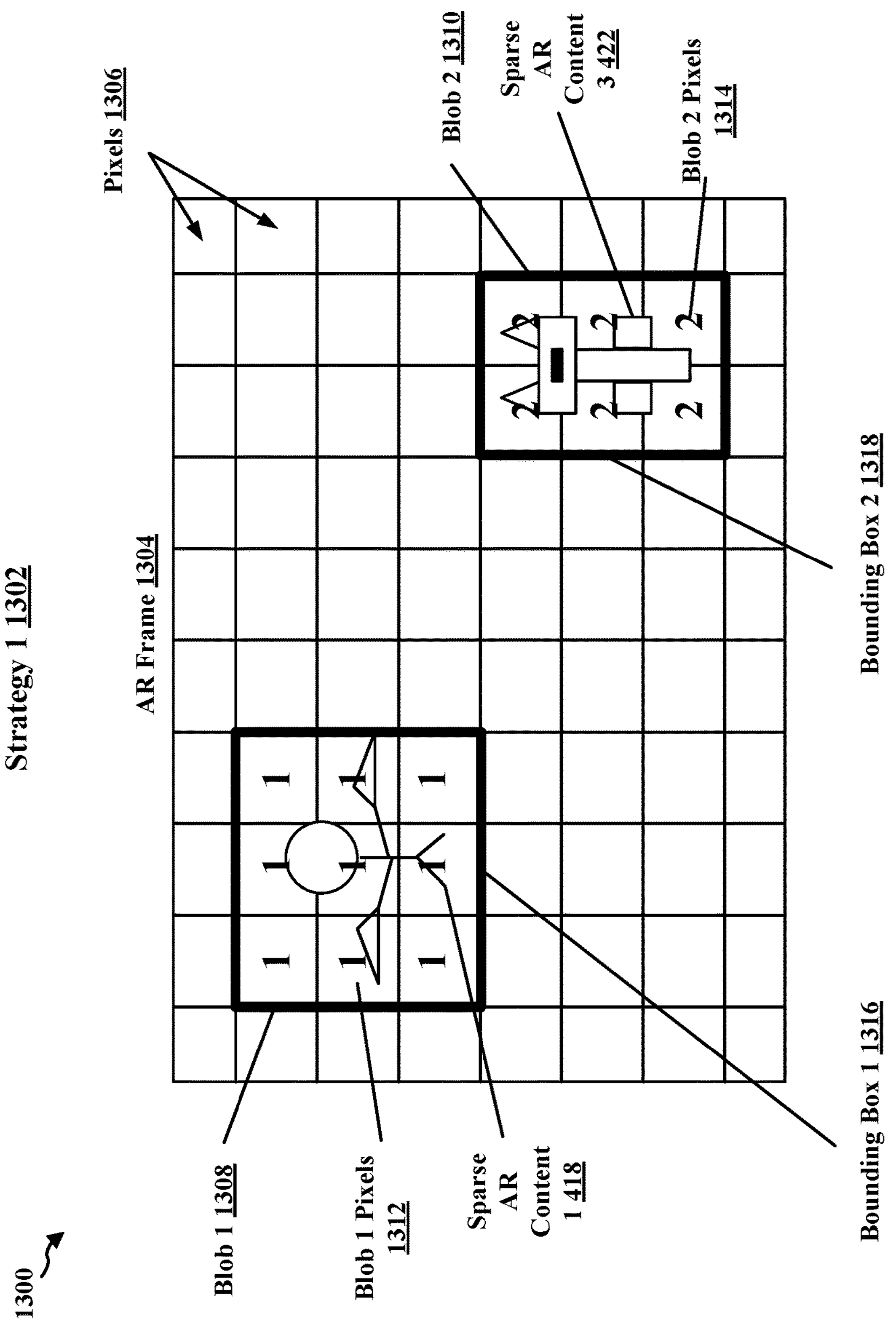
FIG. 13 is a diagram illustrating a first strategy for finding multiple bounding regions for an AR frame in accordance with one or more techniques of this disclosure.

FIG. 13 is a diagram 1300 illustrating a first strategy 1302 for finding multiple bounding regions for an AR frame 1304 in accordance with one or more techniques of this disclosure. The first strategy 1302 may be associated with a multi-bounding box calculation via number blob detection. In the first strategy 1302, a device (e.g., graphics processor hardware, graphics processor software, graphics processor firmware, display processor hardware, display processor software, display processor firmware, a hardware block between a graphics processor and a display processor) may define a blob to be a collection of connected pixels, that is, each pixel in a blob (i.e., a blob pixel) may be within N pixels of another blob, where N is a positive integer. The device may associate each active pixel in pixels 1306 of the AR frame 1304 with one blob. The device may compute a total number of blobs (i.e., independent blobs). The device may compute (i.e., calculate) a bounding area (e.g., a bounding box, a bounding region) for each blob based on the (associated) active pixels.

With more particularity, in a first step of the first strategy 1302, the device may find a number of independent blobs and assign active pixels in the AR frame 1304 to a specific blob via an algorithm that is configured to determine connected groups of pixels in a sparse image. In an example, the device may determine that the AR frame 1304 includes a first blob 1308 (corresponding to the first sparse AR content 418) and a second blob 1310 (corresponding to the third sparse AR content 422) via the algorithm. The device may assign first active pixels (i.e., first blob pixels 1312) in the AR frame 1304 to the first blob 1308 and the device may assign second active pixels (i.e., second blob pixels 1314) in the AR frame 1304 to the second blob 1310.

A description of the above-described algorithm (i.e., the blob detection algorithm) is now set forth. The device may read each pixel in the AR frame 1304 in a right-to-left, top-to-bottom order. When the device reads an active pixel (e.g., when the device finds an active pixel), the device may assign the active pixel to a blob based on blob assignments of pixels that are near the active pixel. For instance, the device may determine (1) whether a blob assigned pixel (i.e., a pixel that is already assigned to a blob) exists above the active pixel or (2) whether a blob assigned pixel exists to the left of the active pixel. If the blob assigned pixel exists above the active pixel or to the left of the active pixel, the device may assign the active pixel to a blob of the blob assigned pixel. If no blob assigned pixel exists above the active pixel or to the left of the active pixel, the device may assign the active pixel to a new blob. The device may process all pixels of the AR frame 1304 in this manner. After all pixels of the AR frame 1304 are processed, the device may ascertain a total number of blobs of the AR frame 1304 and the device may assign active pixels to the blobs.

In a second step of the first strategy 1302, the device may compute (i.e., calculate) a bounding box or a bounding region (i.e., a blob bounding box or a blob bounding region) for each blob. For example, the device may compute a first bounding box 1316 for the first blob 1308 and a second bounding box 1318 for the second blob 1310, where the first bounding box 1316 may encompass the first sparse AR content 418 and where the second bounding box 1318 may encompass the third sparse AR content 422. In an example, for each blob, the device may read locations of each pixel of a blob to determine a minimum X coordinate (referred to as Min X), a maximum X coordinate (referred to as Max X), a minimum Y coordinate (referred to as Min Y), and a maximum Y coordinate (referred to as Max Y). The device may compute (i.e., define) a blob bounding region for each blob as a box with corners at the minimum X coordinate, the maximum X coordinate, the minimum Y coordinate, and the maximum Y coordinate according to equation (III) below.

$$\text{Blob Bounding Box} = [(\text{Min}X, \text{Min}Y), (\text{Min}X, \text{Max}Y), (\text{Max}X, \text{Min}Y), (\text{Max}X, \text{Max}Y)] \quad \text{(III)}$$

Figure 14:
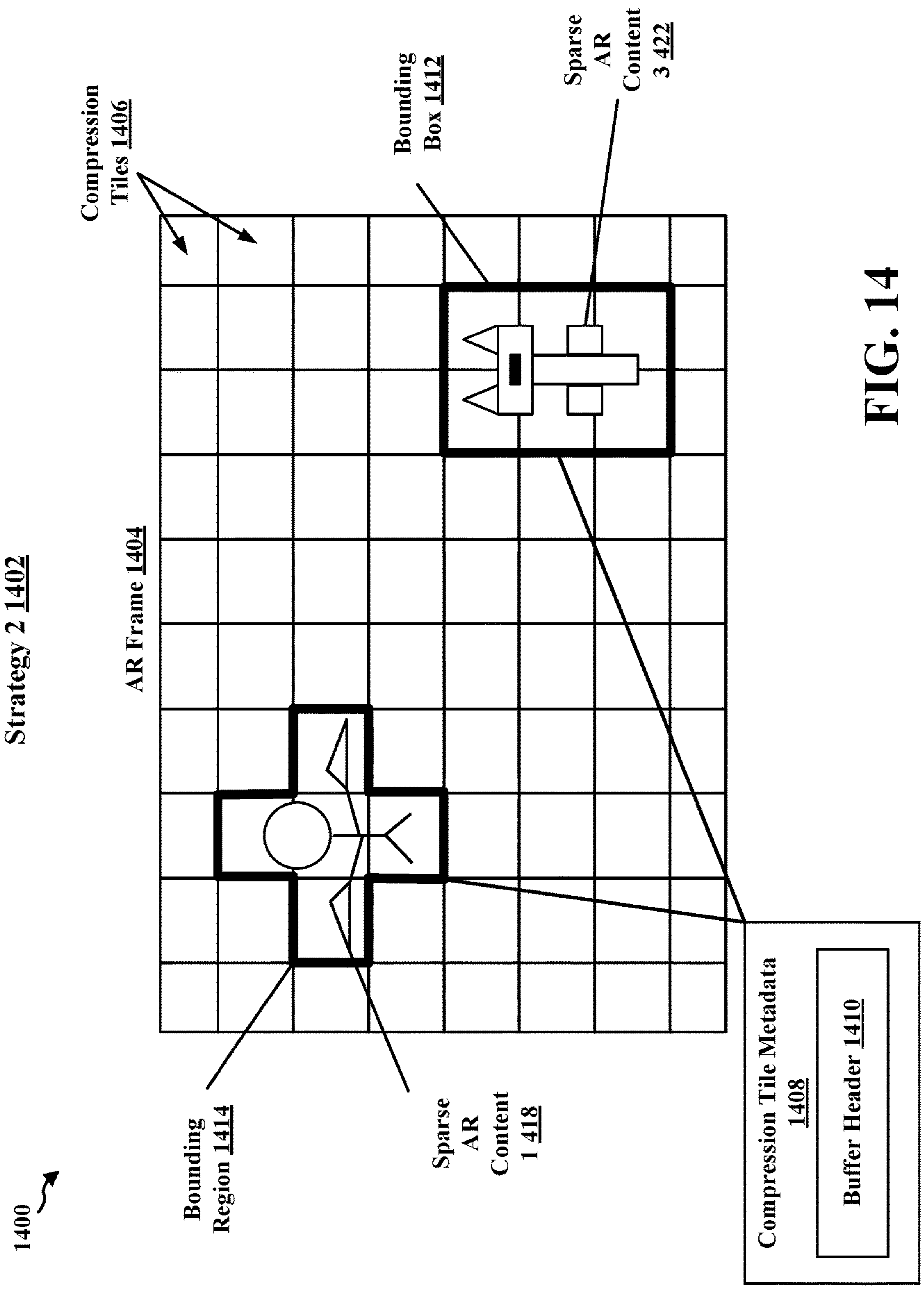
FIG. 14 is a diagram illustrating a second strategy for finding multiple bounding regions for an AR frame in accordance with one or more techniques of this disclosure.

FIG. 14 is a diagram 1400 illustrating a second strategy 1402 for finding multiple bounding regions for an AR frame 1404 in accordance with one or more techniques of this disclosure. The second strategy 1402 may be associated with using compression header data to imply bounding regions. Graphics associated data (e.g., the AR frame 1404) may be compressed as the graphics associated data is transmitted between different hardware elements of a device (e.g., the device 104) in order to reduce bandwidth demands on the device. For example, a graphics processor may render the AR frame 1404, compress the AR frame 1404, and transmit the (compressed) AR frame 1404 to a display processor. The display processor may receive the (compressed) AR frame 1404, decompress the (compressed) AR frame 1404, and perform further processing on the (decompressed) AR frame 1404.

In an example, a device (e.g., a graphics processor) that compresses/decompresses data according to some compression/decompression formats may subdivide the AR frame 1404 into compression tiles 1406 of a fixed size. In the example, the device may maintain compression tile metadata 1408 that includes a buffer header 1410, where the buffer header 1410 indicates which tiles in the compression tiles 1406 include data.

In the second strategy 1402, a display processor (e.g., the display processor 127) may receive the compression tile metadata 1408 from a graphics processor (e.g., the GPU 200). The display processor may search the compression tile metadata 1408 (e.g., the buffer header 1410 of the compression tile metadata 1408) to determine tiles in the compression tiles 1406 that include data, that is, the display processor may search compression tile metadata 1408 to determine active pixels (i.e., active tiles) in the AR frame 1404. In one example, the display processor may compute (e.g., derive) a bounding box 1412 based on search results for the search, where the bounding box 1412 encompasses the third sparse AR content 422. In another example, the display processor may compute (e.g., derive) a bounding region 1414 based on the search results for the search, where the bounding region 1414 encompasses the first sparse AR content 418. In an example, the search may be a modified version of the above-described blob detection algorithm that uses the compression tiles 1406 instead of pixels in order to find blobs. The modified blob detection algorithm may execute in less time compared to a time that the above-described blob detection algorithm takes to execute; however, bounding regions and/or bounding boxes computed by the modified blob detection algorithm may be coarser compared to bounding regions and/or bounding boxes computed by the above-described blob detection algorithm.

Although the second strategy 1402 is described above as being performed/implemented by a display processor, other possibilities are contemplated. For example, a hardware block between a graphics processor and a display processor may perform/implement the second strategy 1402 as described above.

Figure 15:
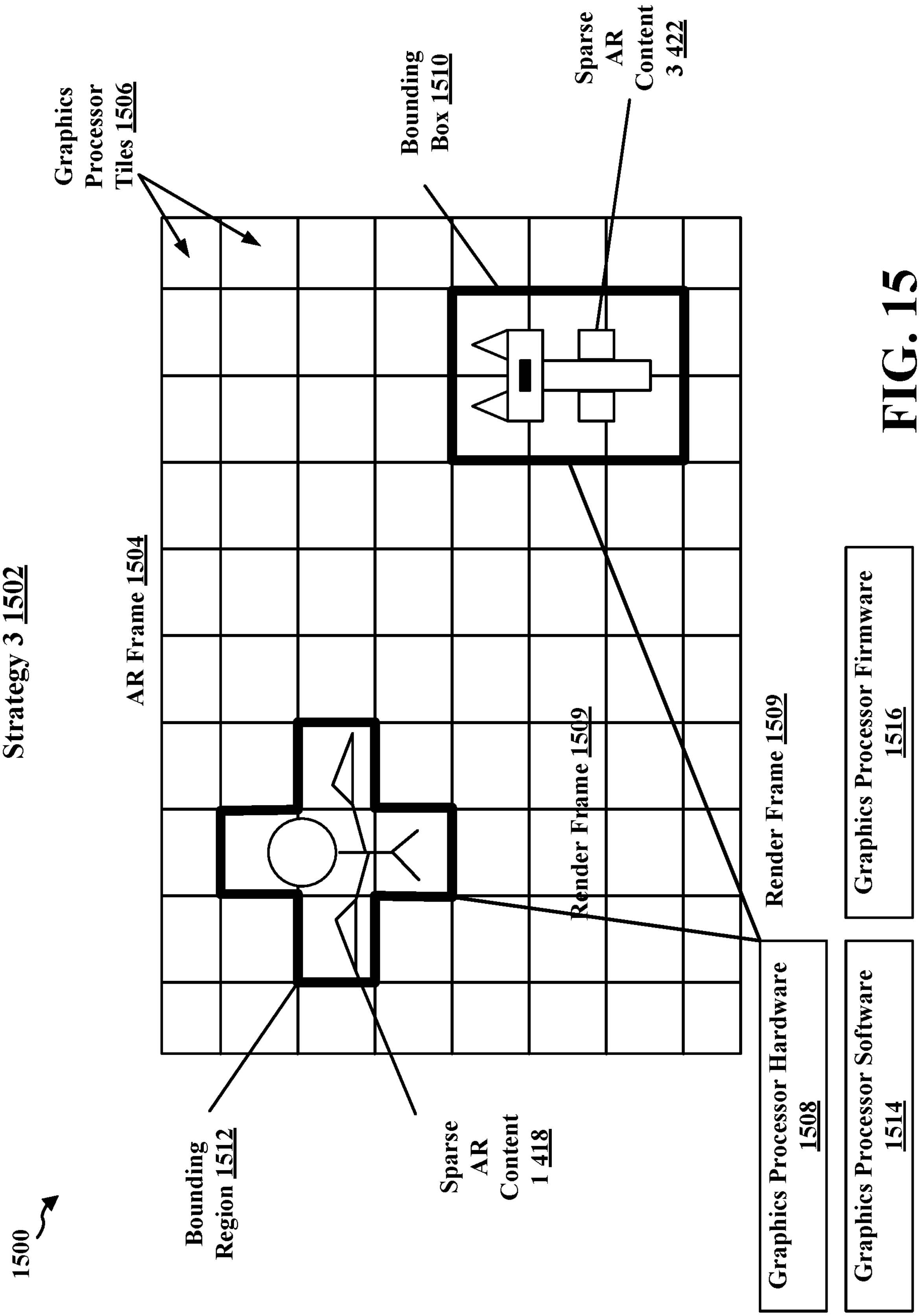
FIG. 15 is a diagram illustrating a third strategy for finding multiple bounding regions for an AR frame in accordance with one or more techniques of this disclosure.

FIG. 15 is a diagram 1500 illustrating a third strategy 1502 for finding multiple bounding regions for an AR frame 1504 in accordance with one or more techniques of this disclosure. The third strategy 1502 may be associated with using a GPU tile output to imply bounding regions. A graphics processor (e.g., the GPU 200) may subdivide a frame (e.g., the AR frame 1504) into graphics processor tiles 1506 of a fixed size during a render process.

In the third strategy 1502, graphics processor hardware 1508 (e.g., the graphics processor hardware 1106), during a frame render at 1509, may track tiles (i.e., active tiles) in the graphics processor tiles 1506 that have active pixels. In an example, the graphics processor hardware 1508 may track the tiles that have active pixels via a modified version of the above-described blob detection algorithm that uses the graphics processor tiles 1506 instead of pixels in order to find blobs. The modified blob detection algorithm may execute in less time compared to a time that the above-described blob detection algorithm takes to execute; however, bounding regions and/or bounding boxes computed by the modified blob detection algorithm may be coarser compared to bounding regions and/or bounding boxes computed by the above-described blob detection algorithm. In one example, the graphics processor hardware 1508 may compute (e.g., derive) a bounding box 1510 based on the active tiles, where the bounding box 1510 encompasses the third sparse AR content 422. In another example, the graphics processor hardware 1508 may compute (e.g., derive) a bounding region 1512 based on the active tiles, where the bounding region 1512 encompasses the first sparse AR content 418.

Although the third strategy 1502 is described above as being performed/implemented by the graphics processor hardware 1508, other possibilities are contemplated. For example, graphics processor software 1514 (e.g., the graphics processor software 1114) or graphics processor firmware 1516 (e.g., the graphics processor firmware 1116) may perform/implement the third strategy 1502 as described above.

The above-described technologies may be associated with various advantages. For instance, for sparse AR content, the above-described technologies may efficiently calculate a bounding area (e.g., a bounding box or a bounding region) for active pixels (i.e., active AR content), which may reduce power usage of an AR device. Furthermore, as some AR devices may be predicated on exploiting sparsity of AR content, and as processing power used for processing AR content may be proportional to a number of pixels processed, the above-described technologies may reduce processing resources (e.g., clock cycles, memory, etc.) used by an AR device. The above-described technologies may avoid and/or mitigate pixel processing on inactive pixels during processing steps that occur after AR content has been rendered by a graphics processor, such as composition, color space conversion, reprojection/warp, and/or display-output. Thus, the above-described technologies may reduce an overall power consumption of an AR device.

Figure 16:
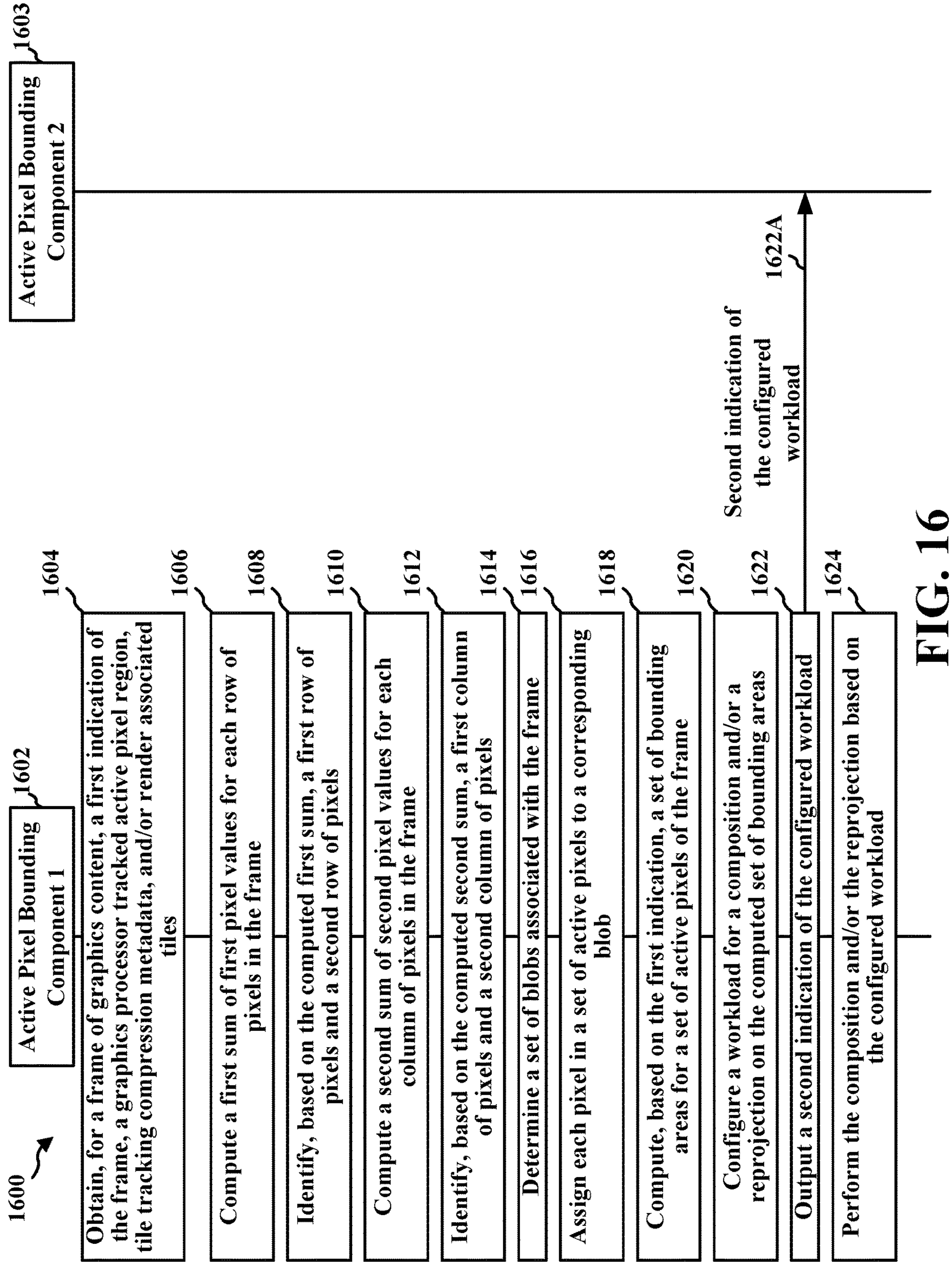
FIG. 16 is a call flow diagram illustrating example communications between a first active pixel bounding component and a second active pixel bounding component in accordance with one or more techniques of this disclosure.

FIG. 16 is a call flow diagram 1600 illustrating example communications between a first active pixel bounding component 1602 and a second active pixel bounding component 1603 in accordance with one or more techniques of this disclosure. In an example, the first active pixel bounding component 1602 and/or the second active pixel bounding component 1603 may be included in the device 104 and/or the AR device 402. For instance, the first active pixel bounding component 1602 and/or the second active pixel bounding component 1603 may be or may be included in the display processor 127 and/or the processing unit 120. In an example, the first active pixel bounding component 1602 may be or include first display processor hardware, first display processor software, first display processor firmware, a first hardware block between a first graphics processor and a first display processor, first graphics processor hardware, first graphics processor firmware, and/or first graphics processor software. In an example, the second active pixel bounding component 1603 may be or include second display processor hardware, second display processor software, second display processor firmware, a second hardware block between the first graphics processor and the first display processor, second graphics processor hardware, second graphics processor firmware, and/or second graphics processor software.

At 1604, the first active pixel bounding component 1602 may obtain, for a frame of graphics content, a first indication of at least one of: the frame, a graphics processor tracked active pixel region associated with the frame, tile tracking compression metadata of the frame, or render associated tiles of the frame. At 1618, the first active pixel bounding component 1602 may compute, based on the first indication, a set of bounding areas for a set of active pixels of the frame. At 1620, the first active pixel bounding component 1602 may configure a workload for at least one of a composition or a reprojection on the computed set of bounding areas for the set of active pixels of the frame. At 1622, the first active pixel bounding component 1602 may output (e.g., to the second active pixel bounding component 1603) a second indication of the configured workload for at least one of the composition or the reprojection on the computed set of bounding areas for the set of active pixels of the frame.

At 1606, the first active pixel bounding component 1602 may compute a first sum of first pixel values for each row of pixels in the frame. At 1608, the first active pixel bounding component 1602 may identify, based on the computed first sum of the first pixel values for each row of pixels in the frame, a first row of pixels of the frame and a second row of pixels of the frame that have a first non-zero sum, where each row of pixels between the first row of pixels and the second row of pixels may have a third non-zero sum, and where each row of pixels outside of the first row of pixels and the second row of pixels may have a zero sum. At 1610, the first active pixel bounding component 1602 may compute a second sum of second pixel values for each column of pixels in the frame. At 1612, the first active pixel bounding component 1602 may identify, based on the computed second sum of the second pixel values for each column of pixels in the frame, a first column of pixels of the frame and a second column of pixels of the frame that have a second non-zero sum, where each column of pixels between the first column of pixels and the second column of pixels may have a fourth non-zero sum, and where each column of pixels outside of the first column of pixels and the second column of pixels may have the zero sum, and where computing the set of bounding areas for the set of active pixels of the frame based on the first indication at 1618 may include computing the set of bounding areas based on the identified first row, the identified second row, the identified first column, and the identified second column. At 1624, the first active pixel bounding component 1602 may perform at least one of the composition or the reprojection based on the configured workload.

At 1614, the first active pixel bounding component 1602 may determine, based on the frame, a set of blobs associated with the frame, where each blob in the set of blobs includes a set of connected pixels. At 1616, the first active pixel bounding component 1602 may assign each pixel in the set of active pixels to a corresponding blob in the set of blobs, where computing the set of bounding areas for the set of active pixels of the frame based on the first indication at 1618 may include computing the set of bounding areas for the frame based on the assignment.

Figure 17:
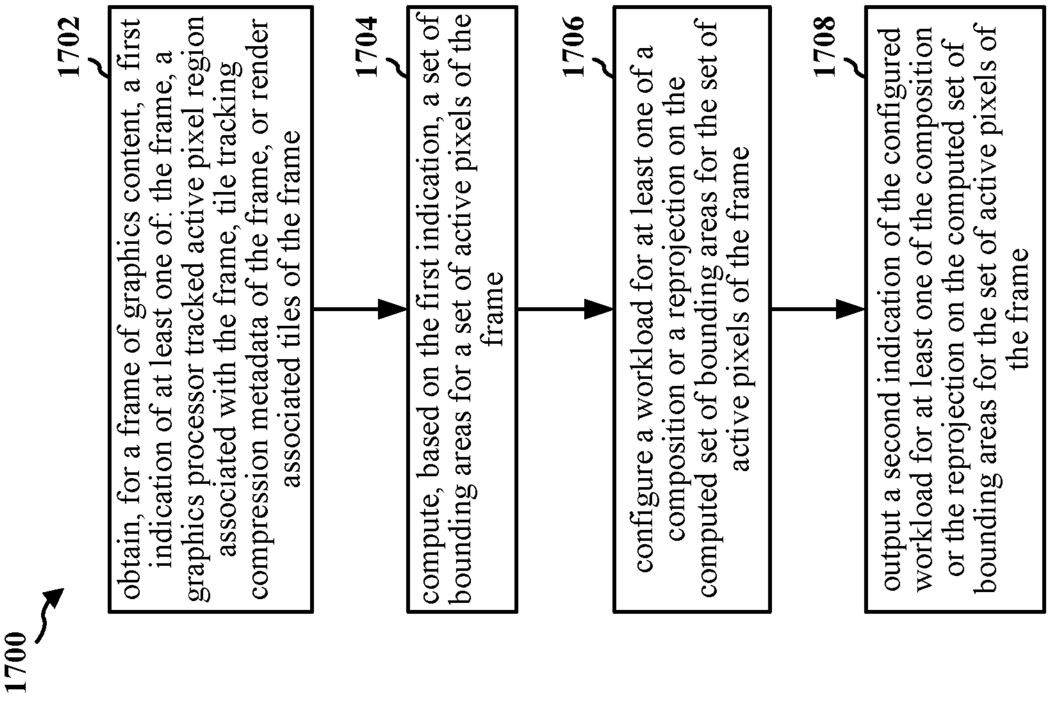
FIG. 17 is a flowchart of an example method of graphics processing in accordance with one or more techniques of this disclosure.

FIG. 17 is a flowchart 1700 of an example method of graphics processing in accordance with one or more techniques of this disclosure. The method may be performed by an apparatus, such as an apparatus for graphics processing, a graphics processor (e.g., a GPU), software executing on a graphics processor, graphics processor firmware, a CPU, a display processing unit (DPU) or other display processor, software executing on a display processor, display processor firmware, a hardware block between a graphics processor and a display processor, a wireless communication device, the device 104, the AR device 402, and the like, as used in connection with the aspects of FIGS. 1-16. In an example, the method may be performed by the bounding box generator 198.

At 1702, the apparatus obtains, for a frame of graphics content, a first indication of at least one of: the frame, a graphics processor tracked active pixel region associated with the frame, tile tracking compression metadata of the frame, or render associated tiles of the frame. For example, FIG. 16 at 1604 shows that the first active pixel bounding component 1602 may obtain, for a frame of graphics content, a first indication of at least one of: the frame, a graphics processor tracked active pixel region associated with the frame, tile tracking compression metadata of the frame, or render associated tiles of the frame. In an example, the frame may be or include the AR frame 514, the AR frame 602, the first AR layer 704, the second AR layer 706, the third AR layer 708, the AR frame 1202, the AR frame 1304, the AR frame 1404, and/or the AR frame 1504. In an example, the frame may be associated with the second strategy 902 or the first strategy 1302. In an example, the graphics processor tracked active pixel region associated with the frame may be associated with the first strategy 802. In an example, the tile tracking compression metadata of the frame may be associated with the third strategy 1002 or the second strategy 1402. In an example, the render associated tiles of the frame may be associated with the fourth strategy 1102 or the third strategy 1502. In an example, the tile tracking compression metadata may be or include the compression tile metadata 1006 or the compression tile metadata 1408. In an example, the render associated tiles of the frame may be or include the graphics processor tiles 1104 or the graphics processor tiles 1506. In an example, 1702 may be performed by the bounding box generator 198.

At 1704, the apparatus computes, based on the first indication, a set of bounding areas for a set of active pixels of the frame. For example, FIG. 16 at 1618 shows that the first active pixel bounding component 1602 may compute, based on the first indication, a set of bounding areas for a set of active pixels of the frame. The set of bounding areas may include bounding box(es) and/or bounding region(s). For instance, the set of bounding areas may be or include the bounding box 816, the bounding box 918, the bounding box 1010, the bounding region 1012, the bounding box 1110, the bounding region 1112, the first bounding box 1316, the second bounding box 1318, the bounding region 1414, the bounding box 1412, the bounding region 1512, and/or the bounding box 1510. In an example, the aforementioned bounding boxes may encompass the first sparse AR content 418, the second sparse AR content 420, and/or the third sparse AR content 422. In an example, the set of active pixels of the frame may be or include the active pixels 516. In an example, 1704 may be performed by the bounding box generator 198.

At 1706, the apparatus configures a workload for at least one of a composition or a reprojection on the computed set of bounding areas for the set of active pixels of the frame. For example, FIG. 16 at 1620 shows that the first active pixel bounding component 1602 may configure a workload for at least one of a composition or a reprojection on the computed set of bounding areas for the set of active pixels of the frame. In an example, 1706 may be performed by the bounding box generator 198.

At 1708, the apparatus outputs a second indication of the configured workload for at least one of the composition or the reprojection on the computed set of bounding areas for the set of active pixels of the frame. For example, FIG. 16 at 1622 shows that the first active pixel bounding component 1602 may output (e.g., to/for the second active pixel bounding component 1603) a second indication of the configured workload for at least one of the composition or the reprojection on the computed set of bounding areas for the set of active pixels of the frame. In an example, 1708 may be performed by the bounding box generator 198.

Figure 18:
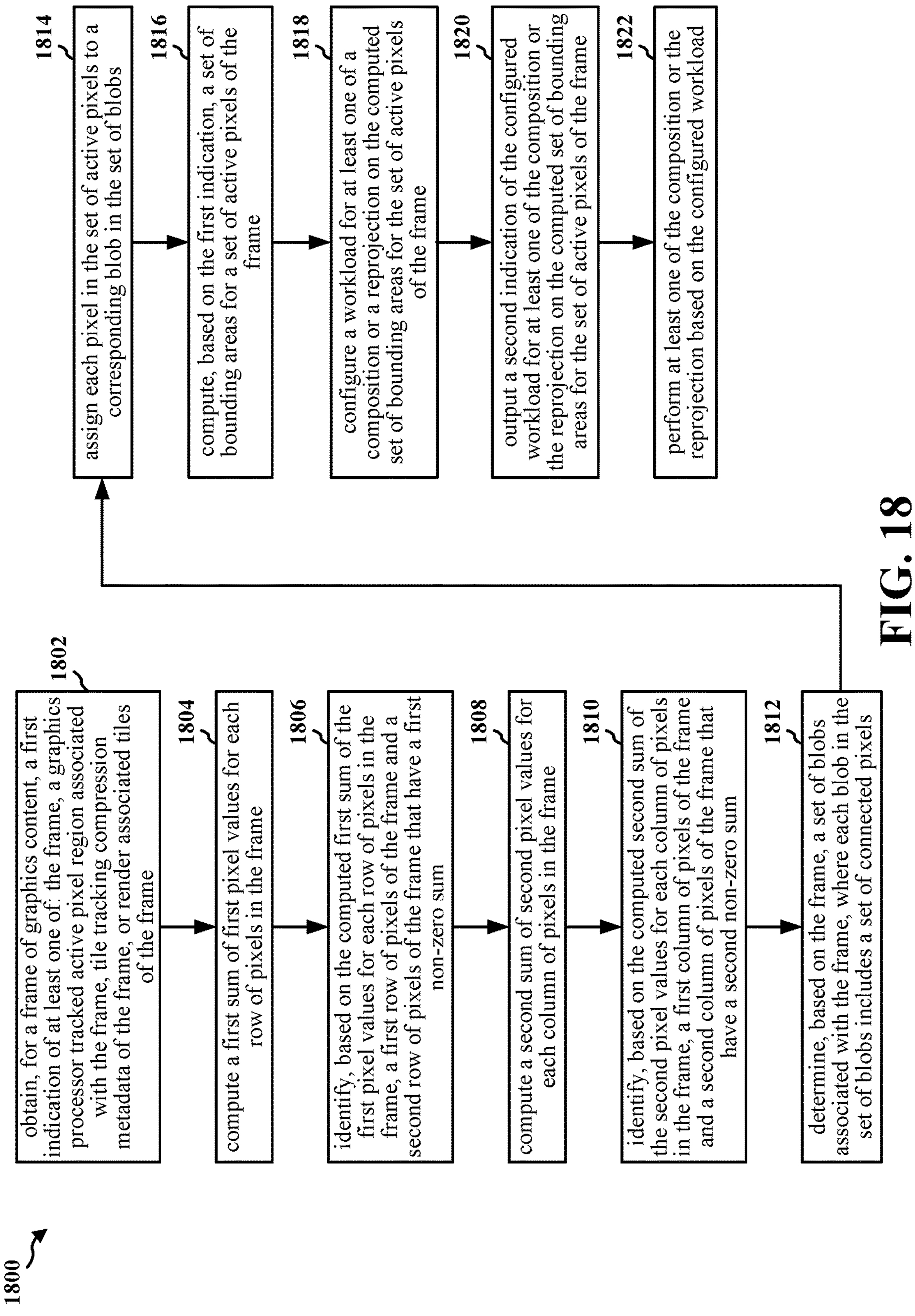
FIG. 18 is a flowchart of an example method of graphics processing in accordance with one or more techniques of this disclosure.

FIG. 18 is a flowchart 1800 of an example method of graphics processing in accordance with one or more techniques of this disclosure. The method may be performed by an apparatus, such as an apparatus for graphics processing, a graphics processor (e.g., a GPU), software executing on a graphics processor, graphics processor firmware, a CPU, a display processing unit (DPU) or other display processor, software executing on a display processor, display processor firmware, a hardware block between a graphics processor and a display processor, a wireless communication device, the device 104, the AR device 402, and the like, as used in connection with the aspects of FIGS. 1-16. In an example, the method (including the various aspects detailed below) may be performed by the bounding box generator 198.

At 1802, the apparatus obtains, for a frame of graphics content, a first indication of at least one of: the frame, a graphics processor tracked active pixel region associated with the frame, tile tracking compression metadata of the frame, or render associated tiles of the frame. For example, FIG. 16 at 1604 shows that the first active pixel bounding component 1602 may obtain, for a frame of graphics content, a first indication of at least one of: the frame, a graphics processor tracked active pixel region associated with the frame, tile tracking compression metadata of the frame, or render associated tiles of the frame. In an example, the frame may be or include the AR frame 514, the AR frame 602, the first AR layer 704, the second AR layer 706, the third AR layer 708, the AR frame 1202, the AR frame 1304, the AR frame 1404, and/or the AR frame 1504. In an example, the frame may be associated with the second strategy 902 or the first strategy 1302. In an example, the graphics processor tracked active pixel region associated with the frame may be associated with the first strategy 802. In an example, the tile tracking compression metadata of the frame may be associated with the third strategy 1002 or the second strategy 1402. In an example, the render associated tiles of the frame may be associated with the fourth strategy 1102 or the third strategy 1502. In an example, the tile tracking compression metadata may be or include the compression tile metadata 1006 or the compression tile metadata 1408. In an example, the render associated tiles of the frame may be or include the graphics processor tiles 1104 or the graphics processor tiles 1506. In an example, 1802 may be performed by the bounding box generator 198.

At 1816, the apparatus computes, based on the first indication, a set of bounding areas for a set of active pixels of the frame. For example, FIG. 16 at 1618 shows that the first active pixel bounding component 1602 may compute, based on the first indication, a set of bounding areas for a set of active pixels of the frame. The set of bounding areas may include bounding box(es) and/or bounding region(s). For instance, the set of bounding areas may be or include the bounding box 816, the bounding box 918, the bounding box 1010, the bounding region 1012, the bounding box 1110, the bounding region 1112, the first bounding box 1316, the second bounding box 1318, the bounding region 1414, the bounding box 1412, the bounding region 1512, and/or the bounding box 1510. In an example, the aforementioned bounding boxes may encompass the first sparse AR content 418, the second sparse AR content 420, and/or the third sparse AR content 422. In an example, the set of active pixels of the frame may be or include the active pixels 516. In an example, 1816 may be performed by the bounding box generator 198.

At 1818, the apparatus configures a workload for at least one of a composition or a reprojection on the computed set of bounding areas for the set of active pixels of the frame. For example, FIG. 16 at 1620 shows that the first active pixel bounding component 1602 may configure a workload for at least one of a composition or a reprojection on the computed set of bounding areas for the set of active pixels of the frame. In an example, 1818 may be performed by the bounding box generator 198.

At 1820, the apparatus outputs a second indication of the configured workload for at least one of the composition or the reprojection on the computed set of bounding areas for the set of active pixels of the frame. For example, FIG. 16 at 1622 shows that the first active pixel bounding component 1602 may output (e.g., to/for the second active pixel bounding component 1603) a second indication of the configured workload for at least one of the composition or the reprojection on the computed set of bounding areas for the set of active pixels of the frame. In an example, 1820 may be performed by the bounding box generator 198.

In one aspect, the graphics processor tracked active pixel region associated with the frame may include a minimum horizontal coordinate associated with the graphics processor tracked active pixel region, a minimum vertical coordinate associated with the graphics processor tracked active pixel region, a maximum horizontal coordinate associated with the graphics processor tracked active pixel region, and a maximum vertical coordinate associated with the graphics processor tracked active pixel region, and computing the set of bounding areas for the set of active pixels based on the first indication at 1618 may include computing the set of bounding areas for the set of active pixels based on the minimum horizontal coordinate, the minimum vertical coordinate, the maximum horizontal coordinate, and the maximum vertical coordinate. In an example, the aforementioned aspect may correspond to the first strategy 802. For instance, the minimum horizontal coordinate may be the minimum X coordinate 808, the minimum vertical coordinate may be the minimum Y coordinate 812, the maximum horizontal coordinate may be the maximum X coordinate 810, and the maximum vertical coordinate may be the maximum Y coordinate 814. In an example, the set of bounding areas may include the bounding box 816.

In one aspect, at 1804, the apparatus may compute a first sum of first pixel values for each row of pixels in the frame. For example, FIG. 16 at 1606 shows that the first active pixel bounding component 1602 may compute a first sum of first pixel values for each row of pixels in the frame. In an example, the aforementioned aspect may correspond to the second strategy 902. For instance, the first sum of the first pixel values may correspond to the row pixel sums 906. In an example, 1804 may be performed by the bounding box generator 198.

In one aspect, at 1806, the apparatus may identify, based on the computed first sum of the first pixel values for each row of pixels in the frame, a first row of pixels of the frame and a second row of pixels of the frame that have a first non-zero sum, where each row of pixels between the first row of pixels and the second row of pixels may have a third non-zero sum, and where each row of pixels outside of the first row of pixels and the second row of pixels may have a zero sum. For example, FIG. 16 at 1608 shows that the first active pixel bounding component 1602 may identify, based on the computed first sum of the first pixel values for each row of pixels in the frame, a first row of pixels of the frame and a second row of pixels of the frame that have a first non-zero sum, where each row of pixels between the first row of pixels and the second row of pixels may have a third non-zero sum, and where each row of pixels outside of the first row of pixels and the second row of pixels may have a zero sum. In an example, the aforementioned aspect may correspond to the second strategy 902. For instance, the first row of pixels may be the first row 910 and the second row of pixels may be the last row 912. In an example, 1806 may be performed by the bounding box generator 198.

In one aspect, at 1808, the apparatus may compute a second sum of second pixel values for each column of pixels in the frame. For example, FIG. 16 at 1610 shows that the first active pixel bounding component 1602 may compute a second sum of second pixel values for each column of pixels in the frame. In an example, the aforementioned aspect may correspond to the second strategy 902. For instance, the second sum of the second pixel values may correspond to the column pixel sums 908. In an example, 1808 may be performed by the bounding box generator 198.

In one aspect, at 1810, the apparatus may identify, based on the computed second sum of the second pixel values for each column of pixels in the frame, a first column of pixels of the frame and a second column of pixels of the frame that have a second non-zero sum, where each column of pixels between the first column of pixels and the second column of pixels may have a fourth non-zero sum, and where each column of pixels outside of the first column of pixels and the second column of pixels may have the zero sum, and where computing the set of bounding areas for the set of active pixels of the frame based on the first indication may include computing the set of bounding areas based on the identified first row, the identified second row, the identified first column, and the identified second column. For example, FIG. 16 at 1612 shows that the first active pixel bounding component 1602 may identify, based on the computed second sum of the second pixel values for each column of pixels in the frame, a first column of pixels of the frame and a second column of pixels of the frame that have a second non-zero sum, where each column of pixels between the first column of pixels and the second column of pixels may have a fourth non-zero sum, and where each column of pixels outside of the first column of pixels and the second column of pixels may have the zero sum, and where computing the set of bounding areas for the set of active pixels of the frame based on the first indication at 1618 may include computing the set of bounding areas based on the identified first row, the identified second row, the identified first column, and the identified second column. In an example, the aforementioned aspect may correspond to the second strategy 902. For instance, the first column may be the first column 914 and the second column may be the last column 916. In an example, 1810 may be performed by the bounding box generator 198.

In one aspect, the tile tracking compression metadata of the frame may include a buffer header that is indicative of tiles associated with the frame that include the set of active pixels, and computing the set of bounding areas for the set of active pixels of the frame based on the first indication may include computing the set of bounding areas based on the buffer header. In an example, the aforementioned aspect may correspond to the third strategy 1002. For instance, the tile compression metadata may be or include the compression tile metadata 1006, the buffer header may be or include the buffer header 1008, and the tiles may be or include the compression tiles 1004. In an example, the aforementioned aspect may correspond to the second strategy 1402. For instance, the tile compression metadata may be or include the compression tile metadata 1408, the buffer header may be or include the buffer header 1410, and the tiles may be or include the compression tiles 1406. In another example, computing the set of bounding areas for the set of active pixels of the frame based on the first indication at 1618 may include computing the set of bounding areas based on the buffer header.

In one aspect, the render associated tiles of the frame may be tracked by at least one of graphics processor software, graphics processor firmware, or graphics processor hardware, where the render associated tiles of the frame may include the set of active pixels, and where computing the set of bounding areas for the set of active pixels of the frame based on the first indication may include computing the set of bounding areas for the frame based on the render associated tiles of the frame. In an example, the aforementioned aspect may correspond to the fourth strategy 1102. For instance, the graphics processor software may be or include the graphics processor software 1114, the graphics processor firmware may be or include the graphics processor firmware 1116, and/or the graphics processor hardware may be or include the graphics processor hardware 1106. In an example, the render associated tiles may be or include the graphics processor tiles 1104. In an example, the aforementioned aspect may correspond to the third strategy 1502. For instance, the graphics processor software may be or include the graphics processor software 1514, the graphics processor firmware may be or include the graphics processor firmware 1516, and/or the graphics processor hardware may be or include the graphics processor hardware 1508. In an example, the render associated tiles may be or include the graphics processor tiles 1506. In another example, computing the set of bounding areas for the set of active pixels of the frame based on the first indication at 1618 may include computing the set of bounding areas for the frame based on the render associated tiles of the frame.

In one aspect, the set of bounding areas may include at least one of a set of bounding boxes or a set of bounding regions, where each bounding box in the set of bounding boxes may include a rectangular shape, and where each bounding region in the set of bounding regions may include a non-rectangular shape. For example, the set of bounding areas may be or include the bounding box 816, the bounding box 918, the bounding box 1010, the bounding region 1012, the bounding box 1110, the bounding region 1112, the first bounding box 1316, the second bounding box 1318, the bounding region 1414, the bounding box 1412, the bounding region 1512, and/or the bounding box 1510. In an example, FIG. 15 shows that the bounding box 1510 may have a rectangular shape and that the bounding region 1512 may have a non-rectangular shape.

In one aspect, at 1812, the apparatus may determine, based on the frame, a set of blobs associated with the frame, where each blob in the set of blobs includes a set of connected pixels. For example, FIG. 16 at 1614 shows that the first active pixel bounding component 1602 may determine, based on the frame, a set of blobs associated with the frame, where each blob in the set of blobs includes a set of connected pixels. In an example, the aforementioned aspect may correspond to the first strategy 1302. For instance, the set of blobs may be or include the first blob 1308 and/or the second blob 1310. In an example, FIG. 13 illustrates connected pixels of the first blob 1308 by "1" and connected pixels of the second blob 1310 by "2." In an example, 1812 may be performed by the bounding box generator 198.

In one aspect, at 1814, the apparatus may assign each pixel in the set of active pixels to a corresponding blob in the set of blobs, where computing the set of bounding areas for the set of active pixels of the frame based on the first indication may include computing the set of bounding areas for the frame based on the assignment. For example, FIG. 15 at 1614 shows that the first active pixel bounding component 1602 may assign each pixel in the set of active pixels to a corresponding blob in the set of blobs, where computing the set of bounding areas for the set of active pixels of the frame based on the first indication at 1618 may include computing the set of bounding areas for the frame based on the assignment. In an example, 1814 may be performed by the bounding box generator 198.

In one aspect, the set of active pixels may correspond to sparse extended reality (XR) content, and where the sparse XR content may include an area that is less than a threshold area of at least one of the frame or a display panel. For example, the sparse XR content may be or include the first sparse AR content 418, the second sparse AR content 420, and/or the third sparse AR content 422. In an example, the first sparse AR content 418, the second sparse AR content 420, and/or the third sparse AR content 422 may have an area that is less than a threshold area of the AR frame 602.

In one aspect, configuring the workload for at least one of the composition or the reprojection on the computed set of bounding areas for the set of active pixels of the frame may include at least one of: calculating the workload for at least one of the composition or the reprojection on the computed set of bounding areas for the set of active pixels of the frame; allocating the workload for at least one of the composition or the reprojection on the computed set of bounding areas for the set of active pixels of the frame; or adjusting the workload for at least one of the composition or the reprojection on the computed set of bounding areas for the set of active pixels of the frame. For example, configuring the workload for at least one of the composition or the reprojection on the computed set of bounding areas for the set of active pixels of the frame at 1620 may include at least one of: calculating the workload for at least one of the composition or the reprojection on the computed set of bounding areas for the set of active pixels of the frame; allocating the workload for at least one of the composition or the reprojection on the computed set of bounding areas for the set of active pixels of the frame; or adjusting the workload for at least one of the composition or the reprojection on the computed set of bounding areas for the set of active pixels of the frame.

In one aspect, at 1822, the apparatus may perform at least one of the composition or the reprojection based on the configured workload. For example, FIG. 16 at 1624 shows that the first active pixel bounding component 1602 may perform at least one of the composition or the reprojection based on the configured workload. In an example, 1822 may be performed by the bounding box generator 198.

In one aspect, performing at least one of the composition or the reprojection based on the configured workload may include performing a segmentation based on the configured workload. For example, performing at least one of the composition or the reprojection based on the configured workload at 1624 may include performing a segmentation based on the configured workload.

In one aspect, performing at least one of the composition or the reprojection based on the configured workload may include performing at least one of the composition or the reprojection on the set of active pixels. For example, performing at least one of the composition or the reprojection based on the configured workload at 1624 may include performing at least one of the composition or the reprojection on the set of active pixels.

In one aspect, the set of active pixels may include a first set of active pixels and a second set of active pixels, where the first set of active pixels may correspond to a first layer and the second set of active pixels may correspond to a second layer, and where performing the composition may include composing the first layer and the second layer. For example, the first set of active pixels may correspond to the first AR layer 704 and the second set of pixels may correspond to the second AR layer 706, and performing the composition at 1624 may include composing the first AR layer 704 and the second AR layer 706.

In one aspect, the frame may include the set of active pixels and a set of inactive pixels, where the set of active pixels may correspond to a first set of regions of a display panel that display the graphics content, and where the set of inactive pixels may correspond to a second set of regions of the display panel that does not display the graphics content. For example, the active pixels may be or include the active pixels 516 and the set of inactive pixels may be or include the inactive pixels 518.

In one aspect, outputting the second indication of the configured workload may include at least one of: transmitting the second indication of the configured workload; or storing the second indication of the configured workload in at least one of a memory, a buffer, or a cache. For example, outputting the second indication of the configured workload at 1622 may include transmitting the second indication of the configured workload (e.g., at 1622A). In another example, outputting the second indication of the configured workload at 1622 may include storing the second indication of the configured workload in at least one of a memory, a buffer, or a cache.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may be a DPU, a display processor, or some other processor that may perform display processing. In aspects, the apparatus may be the display processor 127 within the device 104, or may be some other hardware within the device 104 or another device. The apparatus may include means for obtaining, for a frame of graphics content, a first indication of at least one of: the frame, a graphics processor tracked active pixel region associated with the frame, tile tracking compression metadata of the frame, or render associated tiles of the frame. The apparatus may further include means for computing, based on the first indication, a set of bounding areas for a set of active pixels of the frame. The apparatus may further include means for configuring a workload for at least one of a composition or a reprojection on the computed set of bounding areas for the set of active pixels of the frame. The apparatus may further include means for outputting a second indication of the configured workload for at least one of the composition or the reprojection on the computed set of bounding areas for the set of active pixels of the frame. The apparatus may further include means for computing a first sum of first pixel values for each row of pixels in the frame. The apparatus may further include means for identifying, based on the computed first sum of the first pixel values for each row of pixels in the frame, a first row of pixels of the frame and a second row of pixels of the frame that have a first non-zero sum, where each row of pixels between the first row of pixels and the second row of pixels has a third non-zero sum, and where each row of pixels outside of the first row of pixels and the second row of pixels has a zero sum. The apparatus may further include means for computing a second sum of second pixel values for each column of pixels in the frame. The apparatus may further include means for identifying, based on the computed second sum of the second pixel values for each column of pixels in the frame, a first column of pixels of the frame and a second column of pixels of the frame that have a second non-zero sum, where each column of pixels between the first column of pixels and the second column of pixels has a fourth non-zero sum, and where each column of pixels outside of the first column of pixels and the second column of pixels has the zero sum, and where computing the set of bounding areas for the set of active pixels of the frame based on the first indication includes computing the set of bounding areas based on the identified first row, the identified second row, the identified first column, and the identified second column. The apparatus may further include means for determining, based on the frame, a set of blobs associated with the frame, where each blob in the set of blobs includes a set of connected pixels. The apparatus may further include means for assigning each pixel in the set of active pixels to a corresponding blob in the set of blobs, where computing the set of bounding areas for the set of active pixels of the frame based on the first indication includes computing the set of bounding areas for the frame based on the assignment. The apparatus may further include means for performing at least one of the composition or the reprojection based on the configured workload.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: obtaining, for a frame of graphics content, a first indication of at least one of: the frame, a graphics processor tracked active pixel region associated with the frame, tile tracking compression metadata of the frame, or render associated tiles of the frame; computing, based on the first indication, a set of bounding areas for a set of active pixels of the frame; configuring a workload for at least one of a composition or a reprojection on the computed set of bounding areas for the set of active pixels of the frame; and outputting a second indication of the configured workload for at least one of the composition or the reprojection on the computed set of bounding areas for the set of active pixels of the frame.

Aspect 2 may be combined with aspect 1, wherein the graphics processor tracked active pixel region associated with the frame includes a minimum horizontal coordinate associated with the graphics processor tracked active pixel region, a minimum vertical coordinate associated with the graphics processor tracked active pixel region, a maximum horizontal coordinate associated with the graphics processor tracked active pixel region, and a maximum vertical coordinate associated with the graphics processor tracked active pixel region, and wherein computing the set of bounding areas for the set of active pixels based on the first indication includes computing the set of bounding areas for the set of active pixels based on the minimum horizontal coordinate, the minimum vertical coordinate, the maximum horizontal coordinate, and the maximum vertical coordinate.

Aspect 3 may be combined with any of aspects 1-2, further including: computing a first sum of first pixel values for each row of pixels in the frame; identifying, based on the computed first sum of the first pixel values for each row of pixels in the frame, a first row of pixels of the frame and a second row of pixels of the frame that have a first non-zero sum, wherein each row of pixels between the first row of pixels and the second row of pixels has a third non-zero sum, and wherein each row of pixels outside of the first row of pixels and the second row of pixels has a zero sum; computing a second sum of second pixel values for each column of pixels in the frame; and identifying, based on the computed second sum of the second pixel values for each column of pixels in the frame, a first column of pixels of the frame and a second column of pixels of the frame that have a second non-zero sum, wherein each column of pixels between the first column of pixels and the second column of pixels has a fourth non-zero sum, and wherein each column of pixels outside of the first column of pixels and the second column of pixels has the zero sum, and wherein computing the set of bounding areas for the set of active pixels of the frame based on the first indication includes computing the set of bounding areas based on the identified first row, the identified second row, the identified first column, and the identified second column.

Aspect 4 may be combined with any of aspects 1-3, wherein the tile tracking compression metadata of the frame includes a buffer header that is indicative of tiles associated with the frame that include the set of active pixels, and wherein computing the set of bounding areas for the set of active pixels of the frame based on the first indication includes computing the set of bounding areas based on the buffer header.

Aspect 5 may be combined with any of aspects 1-4, wherein the render associated tiles of the frame are tracked by at least one of graphics processor software, graphics processor firmware, or graphics processor hardware, wherein the render associated tiles of the frame include the set of active pixels, and wherein computing the set of bounding areas for the set of active pixels of the frame based on the first indication includes computing the set of bounding areas for the frame based on the render associated tiles of the frame.

Aspect 6 may be combined with any of aspects 1-5, wherein the set of bounding areas includes at least one of a set of bounding boxes or a set of bounding regions, wherein each bounding box in the set of bounding boxes includes a rectangular shape, and wherein each bounding region in the set of bounding regions includes a non-rectangular shape.

Aspect 7 may be combined with any of aspects 1-6, further including: determining, based on the frame, a set of blobs associated with the frame, wherein each blob in the set of blobs includes a set of connected pixels; and assigning each pixel in the set of active pixels to a corresponding blob in the set of blobs, wherein computing the set of bounding areas for the set of active pixels of the frame based on the first indication includes computing the set of bounding areas for the frame based on the assignment.

Aspect 8 may be combined with any of aspects 1-7, wherein the set of active pixels corresponds to sparse extended reality (XR) content, and wherein the sparse XR content includes an area that is less than a threshold area of at least one of the frame or a display panel.

Aspect 9 may be combined with any of aspects 1-8, wherein configuring the workload for at least one of the composition or the reprojection on the computed set of bounding areas for the set of active pixels of the frame includes at least one of: calculating the workload for at least one of the composition or the reprojection on the computed set of bounding areas for the set of active pixels of the frame; allocating the workload for at least one of the composition or the reprojection on the computed set of bounding areas for the set of active pixels of the frame; or adjusting the workload for at least one of the composition or the reprojection on the computed set of bounding areas for the set of active pixels of the frame.

Aspect 10 may be combined with any of aspects 1-9, further including: performing at least one of the composition or the reprojection based on the configured workload.

Aspect 11 may be combined with aspect 10, wherein performing at least one of the composition or the reprojection based on the configured workload includes performing a segmentation based on the configured workload.

Aspect 12 may be combined with any of aspects 10-11, wherein performing at least one of the composition or the reprojection based on the configured workload includes performing at least one of the composition or the reprojection on the set of active pixels.

Aspect 13 may be combined with any of aspects 10-12, wherein the set of active pixels includes a first set of active pixels and a second set of active pixels, wherein the first set of active pixels corresponds to a first layer and the second set of active pixels corresponds to a second layer, and wherein performing the composition includes composing the first layer and the second layer.

Aspect 14 may be combined with any of aspects 1-13, wherein the frame includes the set of active pixels and a set of inactive pixels, wherein the set of active pixels corresponds to a first set of regions of a display panel that display the graphics content, and wherein the set of inactive pixels corresponds to a second set of regions of the display panel that does not display the graphics content.

Aspect 15 may be combined with any of aspects 1-14, wherein outputting the second indication of the configured workload includes at least one of: transmitting the second indication of the configured workload; or storing the second indication of the configured workload in at least one of a memory, a buffer, or a cache.

Aspect 16 is an apparatus for graphics processing including a processor coupled to a memory and, based on information stored in the memory, the processor is configured to implement a method as in any of aspects 1-15.

Aspect 17 may be combined with aspect 16 and includes that the apparatus is a wireless communication device comprising at least one of an antenna or a transceiver coupled to the processor.

Aspect 18 is an apparatus for graphics processing including means for implementing a method as in any of aspects 1-15.

Aspect 19 is a computer-readable medium (e.g., a non-transitory computer-readable medium) storing computer executable code, the code, when executed by a processor, causes the processor to implement a method as in any of aspects 1-15.

Various aspects have been described herein. These and other aspects are within the scope of the following claims.

What is claimed is:

1. An apparatus for graphics processing, comprising:

a memory; and a processor coupled to the memory and, based on information stored in the memory, the processor is configured to:

obtain, for a frame of graphics content, a first indication of at least one of: the frame, a graphics processor tracked active pixel region associated with the frame, tile tracking compression metadata of the frame, or render associated tiles of the frame;

compute a first sum of first pixel values for each row of pixels in the frame;

identify, based on the computed first sum of the first pixel values for each row of pixels in the frame, a first row of pixels of the frame and a second row of pixels of the frame that have a first non-zero sum, wherein each row of pixels between the first row of pixels and the second row of pixels has a third non-zero sum;

compute a second sum of second pixel values for each column of pixels in the frame;

identify, based on the computed second sum of the second pixel values for each column of pixels in the frame, a first column of pixels of the frame and a second column of pixels of the frame that have a second non-zero sum, wherein each column of pixels between the first column of pixels and the second column of pixels has a fourth non-zero sum;

compute, based on the first indication, a set of bounding areas for a set of active pixels of the frame based on the identified first row, the identified second row, the identified first column, and the identified second column;

configure a workload for at least one of a composition or a reprojection on the computed set of bounding areas for the set of active pixels of the frame; and output a second indication of the configured workload for at least one of the composition or the reprojection on the computed set of bounding areas for the set of active pixels of the frame.

2. The apparatus of claim 1, wherein the graphics processor tracked active pixel region associated with the frame comprises a minimum horizontal coordinate associated with the graphics processor tracked active pixel region, a minimum vertical coordinate associated with the graphics processor tracked active pixel region, a maximum horizontal coordinate associated with the graphics processor tracked active pixel region, and a maximum vertical coordinate associated with the graphics processor tracked active pixel region, and wherein to compute the set of bounding areas for the set of active pixels based on the first indication, the processor is configured to compute the set of bounding areas for the set of active pixels based on the minimum horizontal coordinate, the minimum vertical coordinate, the maximum horizontal coordinate, and the maximum vertical coordinate.

3. The apparatus of claim 1, wherein the tile tracking compression metadata of the frame comprises a buffer header that is indicative of tiles associated with the frame that include the set of active pixels, and wherein to compute the set of bounding areas for the set of active pixels of the frame based on the first indication, the processor is configured to compute the set of bounding areas based on the buffer header.

4. The apparatus of claim 1, wherein the render associated tiles of the frame are tracked by at least one of graphics processor software, graphics processor firmware, or graphics processor hardware, wherein the render associated tiles of the frame include the set of active pixels, and wherein to compute the set of bounding areas for the set of active pixels of the frame based on the first indication, the processor is configured to compute the set of bounding areas for the frame based on the render associated tiles of the frame.

5. The apparatus of claim 1, wherein the set of bounding areas comprises at least one of a set of bounding boxes or a set of bounding regions, wherein each bounding box in the set of bounding boxes comprises a rectangular shape, and wherein each bounding region in the set of bounding regions comprises a non-rectangular shape.

6. The apparatus of claim 1, wherein the processor is further configured to:

determine, based on the frame, a set of blobs associated with the frame, wherein each blob in the set of blobs comprises a set of connected pixels; and assign each pixel in the set of active pixels to a corresponding blob in the set of blobs, wherein to compute the set of bounding areas for the set of active pixels of the frame based on the first indication, the processor is configured to compute the set of bounding areas for the frame based on the assignment.

7. The apparatus of claim 1, wherein the set of active pixels corresponds to sparse extended reality (XR) content, and wherein the sparse XR content comprises an area that is less than a threshold area of at least one of the frame or a display panel.

8. The apparatus of claim 1, wherein to configure the workload for at least one of the composition or the reprojection on the computed set of bounding areas for the set of active pixels of the frame, the processor is configured to at least one of:

calculate the workload for at least one of the composition or the reprojection on the computed set of bounding areas for the set of active pixels of the frame;

allocate the workload for at least one of the composition or the reprojection on the computed set of bounding areas for the set of active pixels of the frame; or adjust the workload for at least one of the composition or the reprojection on the computed set of bounding areas for the set of active pixels of the frame.

9. The apparatus of claim 1, wherein the processor is configured to:

perform at least one of the composition or the reprojection based on the configured workload.

10. The apparatus of claim 9, wherein to perform at least one of the composition or the reprojection based on the configured workload, the processor is configured to perform a segmentation based on the configured workload.

11. The apparatus of claim 9, wherein to perform at least one of the composition or the reprojection based on the configured workload, the processor is configured to perform at least one of the composition or the reprojection on the set of active pixels.

12. The apparatus of claim 9, wherein the set of active pixels comprises a first set of active pixels and a second set of active pixels, wherein the first set of active pixels corresponds to a first layer and the second set of active pixels corresponds to a second layer, and wherein to perform the composition, the processor is configured to compose the first layer and the second layer.

13. The apparatus of claim 1, wherein the frame comprises the set of active pixels and a set of inactive pixels, wherein the set of active pixels corresponds to a first set of regions of a display panel that display the graphics content, and wherein the set of inactive pixels corresponds to a second set of regions of the display panel that does not display the graphics content.

14. The apparatus of claim 1, wherein to output the second indication of the configured workload, the processor is configured to at least one of:

transmit the second indication of the configured workload; or store the second indication of the configured workload in at least one of the memory, a buffer, or a cache.

15. The apparatus of claim 1, wherein the apparatus is a wireless communication device comprising at least one of a transceiver or an antenna coupled to the processor.

16. A method of graphics processing, comprising:

obtaining, for a frame of graphics content, a first indication of at least one of: the frame, a graphics processor tracked active pixel region associated with the frame, tile tracking compression metadata of the frame, or render associated tiles of the frame;

computing a first sum of first pixel values for each row of pixels in the frame;

identifying, based on the computed first sum of the first pixel values for each row of pixels in the frame, a first row of pixels of the frame and a second row of pixels of the frame that have a first non-zero sum, wherein each row of pixels between the first row of pixels and the second row of pixels has a third non-zero sum;

computing a second sum of second pixel values for each column of pixels in the frame;

identifying, based on the computed second sum of the second pixel values for each column of pixels in the frame, a first column of pixels of the frame and a second column of pixels of the frame that have a second non-zero sum, wherein each column of pixels between the first column of pixels and the second column of pixels has a fourth non-zero sum;

computing, based on the first indication, a set of bounding areas for a set of active pixels of the frame based on the identified first row, the identified second row, the identified first column, and the identified second column;

configuring a workload for at least one of a composition or a reprojection on the computed set of bounding areas for the set of active pixels of the frame; and outputting a second indication of the configured workload for at least one of the composition or the reprojection on the computed set of bounding areas for the set of active pixels of the frame.

17. The method of claim 16, wherein the graphics processor tracked active pixel region associated with the frame comprises a minimum horizontal coordinate associated with the graphics processor tracked active pixel region, a minimum vertical coordinate associated with the graphics processor tracked active pixel region, a maximum horizontal coordinate associated with the graphics processor tracked active pixel region, and a maximum vertical coordinate associated with the graphics processor tracked active pixel region, and wherein computing the set of bounding areas for the set of active pixels based on the first indication comprises computing the set of bounding areas for the set of active pixels based on the minimum horizontal coordinate, the minimum vertical coordinate, the maximum horizontal coordinate, and the maximum vertical coordinate.

18. The method of claim 16, wherein configuring the workload for at least one of the composition or the reprojection on the computed set of bounding areas for the set of active pixels of the frame comprises:

calculating the workload for at least one of the composition or the reprojection on the computed set of bounding areas for the set of active pixels of the frame;

allocating the workload for at least one of the composition or the reprojection on the computed set of bounding areas for the set of active pixels of the frame; or adjusting the workload for at least one of the composition or the reprojection on the computed set of bounding areas for the set of active pixels of the frame.

19. The method of claim 16, further comprising:

performing at least one of the composition or the reprojection on the set of active pixels based on the configured workload.

20. A non-transitory computer-readable medium storing computer executable code, the computer executable code, when executed by a processor, causes the processor to:

obtain, for a frame of graphics content, a first indication of at least one of: the frame, a graphics processor tracked active pixel region associated with the frame, tile tracking compression metadata of the frame, or render associated tiles of the frame;

compute a first sum of first pixel values for each row of pixels in the frame;

identify, based on the computed first sum of the first pixel values for each row of pixels in the frame, a first row of pixels of the frame and a second row of pixels of the frame that have a first non-zero sum, wherein each row of pixels between the first row of pixels and the second row of pixels has a third non-zero sum;

compute a second sum of second pixel values for each column of pixels in the frame;

identify, based on the computed second sum of the second pixel values for each column of pixels in the frame, a first column of pixels of the frame and a second column of pixels of the frame that have a second non-zero sum, wherein each column of pixels between the first column of pixels and the second column of pixels has a fourth non-zero sum;

compute, based on the first indication, a set of bounding areas for a set of active pixels of the frame based on the identified first row, the identified second row, the identified first column, and the identified second column;

configure a workload for at least one of a composition or a reprojection on the computed set of bounding areas for the set of active pixels of the frame; and output a second indication of the configured workload for at least one of the composition or the reprojection on the computed set of bounding areas for the set of active pixels of the frame.

* * * * *